(12) United States Patent
Sambhwani

(10) Patent No.: US 8,897,267 B2
(45) Date of Patent: Nov. 25, 2014

(54) SYSTEM AND METHOD FOR ENABLING SOFTER HANDOVER BY USER EQUIPMENT IN A NON-DEDICATED CHANNEL STATE

(75) Inventor: Sharad Deepak Sambhwani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 124 days.

(21) Appl. No.: 13/438,442

(22) Filed: Apr. 3, 2012

(65) Prior Publication Data

US 2012/0250659 A1 Oct. 4, 2012

Related U.S. Application Data

(60) Provisional application No. 61/471,332, filed on Apr. 4, 2011.

(51) Int. Cl.
| | |
|---|---|
| *H04W 4/00* | (2009.01) |
| *H04W 36/30* | (2009.01) |
| *H04W 74/00* | (2009.01) |

(52) U.S. Cl.
CPC ............ *H04W 36/30* (2013.01); *H04W 74/002* (2013.01)
USPC ........................................................ 370/332

(58) Field of Classification Search
CPC ............................................... H04W 36/0083
USPC ........................................................ 370/332
See application file for complete search history.

(56) References Cited

U.S. PATENT DOCUMENTS

| | | | |
|---|---|---|---|
| 2005/0181814 A1* | 8/2005 | Okamoto et al. | ............. 455/517 |
| 2005/0271025 A1* | 12/2005 | Guethaus et al. | ............. 370/342 |
| 2007/0165567 A1 | 7/2007 | Tan et al. | |
| 2008/0212542 A1* | 9/2008 | Kung et al. | ................... 370/336 |

(Continued)

FOREIGN PATENT DOCUMENTS

| | | |
|---|---|---|
| EP | 1983665 A1 | 10/2008 |
| EP | 2214449 A1 | 8/2010 |
| WO | 9944306 A1 | 9/1999 |
| WO | 2007107090 A1 | 9/2007 |

OTHER PUBLICATIONS

InterDigital Communications, LLC, "Discussion on the need for UL interference control mechanisms in CELL_FACH state",3GPP TSG-RAN WG1 Meeting #65, R1-111613, Barcelona, Spain, May 9-13, 2011, pp. 1-3.

(Continued)

*Primary Examiner* — Hassan Kizou
*Assistant Examiner* — Ashil Farahmand
(74) *Attorney, Agent, or Firm* — Darren M. Simon

(57) ABSTRACT

One feature provides for an apparatus, system, and method for enabling softer handover by a user equipment in a non-dedicated channel state, such as Cell_FACH state. A user equipment communicates with a base station via a first sector of the base station, and receives a preamble signature partition list. The user equipment determines that a second sector of the base station is available for softer handover, and selects a preamble signature from the preamble signature partition list corresponding to a softer handover configuration associated with the first sector and the second sector. The user equipment may then transmit a softer handover initiation message that includes the preamble signature while in a non-dedicated channel state, such as Cell_FACH.

102 Claims, 21 Drawing Sheets

| Preamble Signature | Sector Partition |
|---|---|
| 0 | Sector A |
| 1 | Sector A |
| 2 | Sector B |
| 3 | Sector B |
| 4 | Sector C |
| 5 | Sector C |
| 6 | Sector A-B |
| 7 | Sector A-B |
| 8 | Sector A-B |
| 9 | Sector A-C |
| 10 | Sector A-C |
| 11 | Sector B-C |
| 12 | Sector B-C |
| 13 | Sector B-C |
| 14 | Sector A-B-C |
| 15 | Sector A-B-C |

(56) References Cited

U.S. PATENT DOCUMENTS

2009/0088175 A1     4/2009   Pelletier et al.
2009/0186624 A1*    7/2009   Cave et al. .................. 455/450
2009/0219893 A1     9/2009   Korpela et al.
2009/0270103 A1    10/2009   Pani et al.
2010/0278130 A1    11/2010   Sambhwani et al.

OTHER PUBLICATIONS

International Search Report and Written Opinion—PCT/US2012/032171—ISA/EPO—Jul. 9, 2012.

QUALCOMM Incorporated, On the benefits of signaling based interference control in CELL_FACH, 3GPP TSG RAN WG2 Meeting #74, R2-112851, Barcelona, ES, May 9-13, 2011, pp. 1-5.

* cited by examiner

800

802

| Sector A | Channel Codes for Sector A | | | |
|---|---|---|---|---|
| Resource Index | PSC | F-DPCH | E-HICH | E-RGCH |
| 0 | 7 | 64 | 59 | 19 |
| 1 | 7 | 9 | 103 | 46 |
| 2 | 2 | 32 | 21 | 63 |
| 3 | 2 | 75 | 50 | 11 |
| ... | ... | ... | ... | ... |
| 30 | 3 | 118 | 31 | 85 |
| 31 | 14 | 65 | 56 | 52 |

804

| Sector B | Channel Codes for Sector B | | | |
|---|---|---|---|---|
| Resource Index | PSC | F-DPCH | E-HICH | E-RGCH |
| 0 | 8 | 110 | 39 | 97 |
| 1 | 2 | 8 | 98 | 28 |
| 2 | 6 | 86 | 43 | 72 |
| 3 | 5 | 12 | 54 | 42 |
| ... | ... | ... | ... | ... |
| 30 | 4 | 32 | 44 | 25 |
| 31 | 3 | 18 | 73 | 93 |

806

| Sector C | Channel Codes for Sector C | | | |
|---|---|---|---|---|
| Resource Index | PSC | F-DPCH | E-HICH | E-RGCH |
| 0 | 10 | 99 | 65 | 8 |
| 1 | 13 | 16 | 74 | 12 |
| 2 | 5 | 44 | 126 | 29 |
| 3 | 1 | 0 | 92 | 56 |
| ... | ... | ... | ... | ... |
| 30 | 13 | 86 | 93 | 68 |
| 31 | 4 | 122 | 107 | 18 |

*FIG. 8A*

| Sector A-B | Channel Codes for Sector A | | | | Channel Codes for Sector B | | | |
|---|---|---|---|---|---|---|---|---|
| Resource Index | PSC | F-DPCH | E-HICH | E-RGCH | PSC | F-DPCH | E-HICH | E-RGCH |
| 0 | 9 | 16 | 122 | 48 | 14 | 9 | 92 | 42 |
| 1 | 15 | 125 | 61 | 76 | 5 | 8 | 68 | 80 |
| 2 | 12 | 17 | 92 | 79 | 15 | 92 | 13 | 51 |
| 3 | 4 | 94 | 53 | 18 | 5 | 96 | 78 | 36 |
| ... | ... | ... | ... | ... | ... | ... | ... | ... |
| 30 | 11 | 8 | 83 | 39 | 11 | 38 | 46 | 102 |
| 31 | 6 | 54 | 11 | 104 | 6 | 122 | 78 | 78 |

808

| Sector A-C | Channel Codes for Sector A | | | | Channel Codes for Sector C | | | |
|---|---|---|---|---|---|---|---|---|
| Resource Index | PSC | F-DPCH | E-HICH | E-RGCH | PSC | F-DPCH | E-HICH | E-RGCH |
| 0 | 13 | 50 | 64 | 104 | 6 | 46 | 78 | 123 |
| 1 | 8 | 35 | 92 | 39 | 11 | 89 | 66 | 79 |
| 2 | 8 | 62 | 63 | 55 | 10 | 27 | 61 | 71 |
| 3 | 5 | 121 | 6 | 93 | 8 | 106 | 38 | 105 |
| ... | ... | ... | ... | ... | ... | ... | ... | ... |
| 30 | 10 | 126 | 49 | 123 | 13 | 32 | 65 | 86 |
| 31 | 5 | 93 | 73 | 46 | 2 | 117 | 63 | 114 |

810

| Sector B-C | Codes for Sector B | | | | Channel Codes for Sector C | | | |
|---|---|---|---|---|---|---|---|---|
| Resource Index | PSC | F-DPCH | E-HICH | E-RGCH | PSC | F-DPCH | E-HICH | E-RGCH |
| 0 | 8 | 110 | 12 | 60 | 10 | 108 | 3 | 34 |
| 1 | 0 | 49 | 61 | 14 | 0 | 78 | 123 | 105 |
| 2 | 9 | 107 | 77 | 88 | 14 | 22 | 113 | 116 |
| 3 | 10 | 126 | 25 | 104 | 4 | 40 | 2 | 107 |
| ... | ... | ... | ... | ... | ... | ... | ... | ... |
| 30 | 3 | 9 | 33 | 37 | 0 | 100 | 98 | 71 |
| 31 | 14 | 100 | 2 | 4 | 14 | 98 | 2 | 97 |

| Sector A-B-C | Codes for Sector A | | | | Channel Codes for Sector B | | | | Channel Codes for Sector C | | | |
|---|---|---|---|---|---|---|---|---|---|---|---|---|
| Resource Index | PSC | F-DPCH | E-HICH | E-RGCH | PSC | F-DPCH | E-HICH | E-RGCH | PSC | F-DPCH | E-HICH | E-RGCH |
| 0 | 10 | 110 | 4 | 101 | 1 | 15 | 51 | 110 | 15 | 25 | 105 | 79 |
| 1 | 9 | 61 | 70 | 43 | 14 | 99 | 112 | 49 | 2 | 58 | 111 | 0 |
| 2 | 12 | 80 | 126 | 47 | 5 | 95 | 37 | 85 | 5 | 108 | 101 | 58 |
| 3 | 11 | 63 | 71 | 28 | 15 | 32 | 6 | 25 | 15 | 75 | 115 | 38 |
| ... | ... | ... | ... | ... | ... | ... | ... | ... | ... | ... | ... | ... |
| 30 | 5 | 110 | 19 | 105 | 6 | 55 | 118 | 5 | 5 | 2 | 36 | 54 |
| 31 | 12 | 76 | 84 | 63 | 7 | 74 | 120 | 117 | 7 | 68 | 103 | 123 |

*FIG. 8C*

| Preamble Signature | Sector Partition |
|---|---|
| 0 | Sector A |
| 1 | Sector A |
| 2 | Sector B |
| 3 | Sector B |
| 4 | Sector C |
| 5 | Sector C |
| 6 | Sector A-B |
| 7 | Sector A-B |
| 8 | Sector A-B |
| 9 | Sector A-C |
| 10 | Sector A-C |
| 11 | Sector B-C |
| 12 | Sector B-C |
| 13 | Sector B-C |
| 14 | Sector A-B-C |
| 15 | Sector A-B-C |

*FIG. 9*

SYSTEM AND METHOD FOR ENABLING SOFTER HANDOVER BY USER EQUIPMENT IN A NON-DEDICATED CHANNEL STATE

CROSS-REFERENCE TO RELATED APPLICATIONS

This application claims priority to and the benefit of provisional patent application No. 61/471,332 and titled "SOFTER HANDOVER IN CELL_FACH," filed in the United States Patent and Trademark Office on Apr. 4, 2011, the entire content of which is incorporated herein by reference.

BACKGROUND

1. Field

Aspects of the present disclosure relate generally to wireless communication systems, and more particularly, to enabling softer handover by user equipment in a wireless communication system.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). UMTS also supports enhanced 3G data communications protocols, such as High Speed Packet Access (HSPA), which provides higher data transfer speeds and capacity to associated UMTS networks.

"Softer handover" or "softer handoff" refers to a mode of operation used by the UMTS standards, where a mobile station is simultaneously connected to two or more sectors of the same physical cell site (e.g., cell) during a call, and thus, its active set size is greater than one. If the mobile station is simultaneously connected to two or more different physical cell sites then the operation is referred to as "soft handover" or "soft handoff." Soft and/or softer handover are forms of mobile station-assisted handover. Due to the properties of the CDMA signaling scheme, it is possible for a CDMA mobile station to simultaneously receive signals from two or more remote radio heads (RRHs) and/or radio base stations that are transmitting the same bit stream (although perhaps using different transmission codes) on different physical channels in the same frequency bandwidth. If the signal power from two or more RRHs is nearly the same, the phone receiver can combine the received signals in such a way that the bit stream is decoded much more reliably than if only one RRH were transmitting to the mobile station. If any one of these signals fades significantly, the mobile station may have adequate signal strength from one of the other RRHs. Thus, soft and softer handover mitigate interference and provide improved quality of service.

Furthermore, in many modern wireless communication systems, mobile stations may assume any of various different states based on their needs at any particular time to enable a high level of control over power usage. For example, these states can include: states with dedicated resources assigned to the mobile station; various levels of standby states having corresponding tiers of communication capabilities; and idle states with little to no wireless connectivity. Within the various standby states, the network may have a reduced level of control over the plurality of mobile stations throughout the cell.

In a particular example, such as a conventional 3GPP UMTS network, one of the standby states is referred to as Cell_FACH. According to current specifications, the network is limited in that the mobile stations cannot be in soft and/or softer handover mode when the mobile stations are operating in the Cell_FACH state, and thus, the mobile stations are limited to having an active set size equal to or less than one while in the Cell_FACH state. This limitation currently persists notwithstanding the availability of softer handover in dedicated resource channel states, such as Cell_DCH.

Distributed base station systems with remote radio head capability allow for increased signal coverage area in a cost effective manner. Such systems feature multiple RRHs all connected (e.g., through fiber optic cables) to a central baseband processing unit associated with the base station to which they are connected. The RRHs may be deployed to provide extended signal coverage to sectors associated with different geographical areas. In some cases, the RRHs may be deployed in such a manner so that they provide increased and/or overlapping signal coverage to geographical areas that already receive coverage at least in part from one or more other RRHs, and are thus already associated with one or more sectors. As the deployment of RRHs continues to increase in UMTS and other networks, the proportion of mobile stations that fall within the overlapping coverage area of two adjacent sectors belonging to the same base station increases accordingly. Thus, there is a need to provide softer handover operation in CELL_FACH.

As the demand for mobile broadband access continues to increase, research and development continue to advance the UMTS technologies not only to meet the growing demand for mobile broadband access, but to advance and enhance the user experience with mobile communications.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the disclosure provide for systems, devices, and methods for enabling softer handover by user equipment in a non-dedicated channel state.

One feature provides a method of wireless communication operable at a user equipment where the method comprises communicating with a base station via a first sector of the base station, receiving a preamble signature partition list, determining that a second sector of the base station is available for softer handover, selecting a preamble signature from the preamble signature partition list corresponding to a softer handover configuration associated with the first sector and the second sector, and transmitting a softer handover initiation message including the preamble signature while in a non-dedicated channel state. According to one aspect of the disclosure, the non-dedicated channel state is a Cell_FACH state. According to another aspect, the first sector is a serving sector and the second sector is a non-serving sector. According to yet another aspect, the step of determining that the second sector of the base station is available for softer handover comprises determining that a power level difference between a first signal received from the first sector and a second signal received from the second sector is less than a predefined threshold value. According to one example, the first signal and the second signal are common pilot indicator channels. According to another aspect, the step of determining that the second sector of the base station is available for softer handover comprises determining that the signal to noise ratio of a signal received from the second sector is greater than a predefined threshold value. According to one aspect, the softer handover initiation message is a random access message transmitted over a physical random access channel (PRACH).

According to another aspect, the method further comprises receiving a multi-sector common enhanced uplink dedicated channel (E-DCH) system information resource list that includes channel code information of channels that facilitate uplink transmissions, where the channel code information is associated with a plurality of sectors of the base station. According to yet another aspect, the method further comprises receiving a multi-sector E-DCH resource index value from the base station in response to transmitting the softer handover initiation message. According to yet another aspect, the method further comprises selecting E-DCH resources from the multi-sector common E-DCH system information resource list based on the multi-sector E-DCH resource index value, receiving a first data stream from a first portion of the selected E-DCH resources via the first sector, and receiving a second data stream from a second portion of the selected E-DCH resources via the second sector. According to one aspect, the first portion of the selected E-DCH resources includes at least one of a fractional dedicated physical channel (F-DPCH), E-DCH Hybrid Automatic Repeat Request (HARQ) Indicator Channel (E-HICH), and/or a E-DCH Relative Grant Channel (E-RGCH) associated with the first sector, and the second portion of the selected E-DCH resources includes at least one of a fractional dedicated physical channel (F-DPCH), E-DCH Hybrid Automatic Repeat Request (HARQ) Indicator Channel (E-HICH), and/or a E-DCH Relative Grant Channel (E-RGCH) associated with the second sector. According to one aspect, the method further comprises demodulating the first data stream and the second data stream, and soft combining the demodulated first data stream with the second data stream to recover an underlying raw data.

Another feature provides a user equipment that comprises a communication interface adapted to communicate with a base station via a first sector of the base station, and a processing circuit communicatively coupled to the communication interface, where the processing circuit adapted to receive a preamble signature partition list, determine that a second sector of the base station is available for softer handover, select a preamble signature from the preamble signature partition list corresponding to a softer handover configuration associated with the first sector and the second sector, and transmit a softer handover initiation message including the preamble signature while in a non-dedicated channel state. According to one aspect, the processing circuit is further adapted to receive a multi-sector common enhanced uplink dedicated channel (E-DCH) system information resource list that includes channel code information of channels that facilitate uplink transmissions, the channel code information associated with a plurality of sectors of the base station. According to another aspect, the processing circuit is further adapted to receive a multi-sector E-DCH resource index value from the base station in response to transmitting the softer handover initiation message. According to yet another aspect, the processing circuit is further adapted to select E-DCH resources from the multi-sector common E-DCH system information resource list based on the multi-sector E-DCH resource index value, receive a first data stream from a first portion of the selected E-DCH resources via the first sector, and receive a second data stream from a second portion of the selected E-DCH resources via the second sector. According to another aspect, the processing circuit is further adapted to demodulate the first data stream and the second data stream, and soft combine the demodulated first data stream with the second data stream to recover an underlying raw data.

Another feature provides a user equipment that comprises a means for communicating with a base station via a first sector of the base station, a means for receiving a preamble signature partition list, a means for determining that a second sector of the base station is available for softer handover, a means for selecting a preamble signature from the preamble signature partition list corresponding to a softer handover configuration associated with the first sector and the second sector, and a means for transmitting a softer handover initiation message including the preamble signature while in a non-dedicated channel state. According to one aspect, the means for determining that the second sector of the base station is available for softer handover comprises a means for determining that a power level difference between a first signal received from the first sector and a second signal received from the second sector is less than a predefined threshold value. According to another aspect, the user equipment further comprises a means for receiving a multi-sector common enhanced uplink dedicated channel (E-DCH) system information resource list that includes channel code information of channels that facilitate uplink transmissions, wherein the channel code information is associated with a plurality of sectors of the base station. According to yet another aspect, the user equipment further comprises a means for receiving a multi-sector E-DCH resource index value from the base station in response to transmitting the softer handover initiation message, a means for selecting E-DCH resources from the multi-sector common E-DCH system information resource list based on the multi-sector E-DCH resource index value, a means for receiving a first data stream from a first portion of the selected E-DCH resources via the first sector, and a means for receiving a second data stream from a second portion of the selected E-DCH resources via the second sector.

Another feature provides for a non-transitory processor-readable medium having one or more instructions stored thereon, which when executed by at least one processor causes the processor to communicate with a base station via a first sector of the base station, receive a preamble signature partition list, determine that a second sector of the base station is available for softer handover, select a preamble signature from the preamble signature partition list corresponding to a softer handover configuration associated with the first sector and the second sector, and transmit a softer handover initiation message including the preamble signature while in a non-dedicated channel state. According to one aspect, the instruction that causes the processor to determine that the second sector of the base station is available for softer handover further causes the processor to determine that a power level difference between a first signal received from the first sector and a second signal received from the second sector is less than a predefined threshold value. According to another aspect, the instructions which when executed by the processor further causes the processor to receive a multi-sector common enhanced uplink dedicated channel (E-DCH) system information resource list that includes channel code information of channels that facilitate uplink transmissions, the channel code information associated with a plurality of sectors of the base station. According to yet another aspect, the instructions which when executed by the processor further causes the processor to receive a multi-sector E-DCH resource index value from the base station in response to transmitting the softer handover initiation message, select E-DCH resources from the multi-sector common E-DCH system information resource list based on the multi-sector E-DCH resource index value, receive a first data stream from a first portion of the selected E-DCH resources via the first sector, and receive a second data stream from a second portion of the selected E-DCH resources via the second sector.

Another feature provides a method of wireless communication operable at a base station that comprises communicating with a user equipment (UE) via a first sector of the base station, broadcasting a preamble signature partition list, receiving a softer handover initiation message from the UE that includes a preamble signature, and identifying a softer handover configuration associated with the first sector and a second sector of the base station from the preamble signature partition list based on the preamble signature received. According to one aspect of the disclosure, the first sector is a serving sector to the UE and the second sector is a non-serving sector to the UE. According to another aspect, the softer handover initiation message is a random access message received over a physical random access channel (PRACH). According to yet another aspect, the method further comprises receiving the preamble signature partition list from a radio network controller (RNC). According to one aspect, the method further comprises receiving a multi-sector common enhanced uplink dedicated channel (E-DCH) system information resource list from an RNC. According to another aspect, the method further comprises determining that the UE is located within the first sector and the second sector based on the preamble signature received.

According to another aspect, the method further comprises determining that the UE desires to engage in the softer handover configuration associated with the first sector and a second sector while the UE is in a non-dedicated channel state. According to one aspect, the method further comprises transmitting a multi-sector common E-DCH system information resource list to the UE that includes channel code information of channels that facilitate uplink transmissions, the channel code information associated with a plurality of sectors of the base station. According to another aspect, the method further comprises transmitting a multi-sector E-DCH resource index value to the UE in response to receiving the softer handover initiation message. According to yet another aspect, the method further comprises transmitting, via the first sector, a first data stream over a first portion of E-DCH resources corresponding to the multi-sector E-DCH resource index value, and transmitting, via the second sector, a second data stream over a second portion of E-DCH resources corresponding to the multi-sector E-DCH resource index value. According to one example, the base station is one of a Node B or an evolved Node B. According to one aspect, the first sector and the second sector are both associated with a same carrier frequency.

Another feature provides a base station comprising a communication interface adapted to communicate with a user equipment (UE) via a first sector of the base station, and a processing circuit communicatively coupled to the communication interface, the processing circuit adapted to broadcast a preamble signature partition list, receive a softer handover initiation message from the UE that includes a preamble signature, and identify a softer handover configuration associated with the first sector and a second sector of the base station from the preamble signature partition list based on the preamble signature received. According to one aspect, the processing circuit is further adapted to receive the preamble signature partition list from a radio network controller (RNC). According to another aspect, the processing circuit is further adapted to receive a multi-sector common enhanced uplink dedicated channel (E-DCH) system information resource list from an RNC. According to yet another aspect, the processing circuit is further adapted to determine that the UE is located within the first sector and the second sector based on the preamble signature received.

According to one aspect, the processing circuit is further adapted to determine that the UE desires to engage in the softer handover configuration associated with the first sector and a second sector while the UE is in a non-dedicated channel state. According to yet another aspect, the processing circuit is further adapted to transmit a multi-sector common E-DCH system information resource list to the UE that includes channel code information of channels that facilitate uplink transmissions, the channel code information associated with a plurality of sectors of the base station. According to yet another aspect, the processing circuit is further adapted to transmit a multi-sector E-DCH resource index value to the UE in response to receiving the softer handover initiation message. According to yet another aspect, the processing circuit is further adapted to transmit, via the first sector, a first data stream over a first portion of E-DCH resources corresponding to the multi-sector E-DCH resource index value, and transmit, via the second sector, a second data stream over a second portion of E-DCH resources corresponding to the multi-sector E-DCH resource index value.

Another feature provides a base station comprising a means for communicating with a user equipment (UE) via a first sector of the base station, a means for broadcasting a preamble signature partition list, a means for receiving a softer handover initiation message from the UE that includes a preamble signature, and a means for identifying a softer handover configuration associated with the first sector and a second sector of the base station from the preamble signature partition list based on the preamble signature received. According to one aspect, the base station further comprises a means for receiving the preamble signature partition list from a radio network controller (RNC), and a means for receiving a multi-sector common enhanced uplink dedicated channel (E-DCH) system information resource list from the RNC. According to another aspect, the base station further comprises a means for determining that the UE is located within the first sector and the second sector based on the preamble signature received. According to another aspect, the base station further comprises a means for determining that the UE desires to engage in the softer handover configuration associated with the first sector and a second sector while the UE is in a Cell_FACH state. According to yet another aspect, the base station further comprises a means for transmitting a multi-sector common E-DCH system information resource list to the UE that includes channel code information of channels that facilitate uplink transmissions, the channel code information associated with a plurality of sectors of the base station. According to yet another aspect, the base station further comprises a means for transmitting a multi-sector E-DCH resource index value to the UE in response to receiving the softer handover initiation message, a means for transmitting, via the first sector, a first data stream over a first portion of E-DCH resources corresponding to the multi-sector E-DCH resource index value, and a means for transmitting, via the second sector, a second data stream over a second portion of E-DCH resources corresponding to the multi-sector E-DCH resource index value.

Another feature provides for a non-transitory processor-readable medium having one or more instructions stored thereon, which when executed by at least one processor causes the processor to communicate with a user equipment (UE) via a first sector of a base station, broadcast a preamble signature partition list, receive a softer handover initiation message from the UE that includes a preamble signature, and identify a softer handover configuration associated with the first sector and a second sector of the base station from the preamble signature partition list based on the preamble signature received. According to one aspect, the instructions which when executed by the processor further cause the processor to receive the preamble signature partition list from a radio network controller (RNC), and receive a multi-sector common enhanced uplink dedicated channel (E-DCH) system information resource list from the RNC. According to another aspect, the instructions which when executed by the processor further cause the processor to determine that the UE is located within the first sector and the second sector based on the preamble signature received. According to yet another aspect, the instructions which when executed by the processor further cause the processor to determine that the UE desires to engage in the softer handover configuration associated with the first sector and a second sector while the UE is in a Cell_FACH state. According to yet another aspect, the instructions which when executed by the processor further cause the processor to transmit a multi-sector common E-DCH system information resource list to the UE that includes channel code information of channels that facilitate uplink transmissions, the channel code information associated with a plurality of sectors of the base station. According to yet another aspect, the instructions which when executed by the processor further cause the processor to transmit a multi-sector E-DCH resource index value to the UE in response to receiving the softer handover initiation message, transmit, via the first sector, a first data stream over a first portion of E-DCH resources corresponding to the multi-sector E-DCH resource index value, and transmit, via the second sector, a second data stream over a second portion of E-DCH resources corresponding to the multi-sector E-DCH resource index value.

Another feature provides a method of wireless communication operable at a network node where the method comprises partitioning a preamble signature space into groups, each group corresponding to a sector of a plurality of sectors associated with a base station, generating a preamble signature partition list based on the partitioned preamble signature space, and transmitting the preamble signature partition list to the base station. According to one aspect, the method further comprises generating a multi-sector common enhanced uplink dedicated channel (E-DCH) system information resource list that includes channel code information of channels that facilitate uplink transmissions, the channel code information associated with the plurality of sectors of the base station. According to another aspect, the method further comprises transmitting the multi-sector common E-DCH system information resource list to the base station. According to yet another aspect, the method further comprises generating at least one predefined power threshold value used to determine whether to enable a user equipment in communication with the base station to engage in softer handover between two or more sectors of the plurality of sectors associated with the base station. According to one aspect, a first predefined power threshold value determines whether to enable the user equipment to engage in softer handover between a first set of sectors of the plurality of sectors associated with the base station and a second predefined power threshold value determines whether to enable the user equipment to engage in softer handover between a second different set of sectors of the plurality of sectors associated with the base station. According to another aspect, the preamble signature partition list is adapted to enable a user equipment in communication with the base station to execute softer handover between two or more sectors of the plurality of sectors associated with the base station. According to another aspect, the preamble signature partition list is further adapted to enable the user equipment to execute softer handover in a non-dedicated channel state. According to yet another aspect, the network node is one of a radio network controller (RNC) or an evolved Node B.

Another feature provides a network node that comprises a communication interface adapted to communicate to a network, and a processing circuit communicatively coupled to the communication interface, the processing circuit adapted to partition a preamble signature space into groups, each group corresponding to a sector of a plurality of sectors associated with a base station, generate a preamble signature partition list based on the partitioned preamble signature space, and transmit the preamble signature partition list to the base station. According to one aspect, the processing circuit is further adapted to generate a multi-sector common enhanced uplink dedicated channel (E-DCH) system information resource list that includes channel code information of channels that facilitate uplink transmissions, the channel code information associated with the plurality of sectors of the base station. According to another aspect, the processing circuit is further adapted to transmit the multi-sector common E-DCH system information resource list to the base station. According to yet another aspect, the processing circuit is further adapted to generate at least one predefined power threshold value used to determine whether to enable a user equipment in communication with the base station to engage in softer handover between two or more sectors of the plurality of sectors associated with the base station.

Another feature provides a network node comprising a means for partitioning a preamble signature space into groups, each group corresponding to a sector of a plurality of sectors associated with a base station, a means for generating a preamble signature partition list based on the partitioned preamble signature space, and a means for transmitting the preamble signature partition list to the base station. According to one aspect, the network node further comprises a means for generating a multi-sector common enhanced uplink dedicated channel (E-DCH) system information resource list that includes channel code information of channels that facilitate uplink transmissions, the channel code information associated with the plurality of sectors of the base station, and a means for transmitting the multi-sector common E-DCH system information resource list to the base station. According to another aspect, the network node further comprises a means for generating at least one predefined power threshold value used to determine whether to enable a user equipment in communication with the base station to engage in softer handover between two or more sectors of the plurality of sectors associated with the base station.

Another feature provides a non-transitory processor-readable medium having one or more instructions, which when executed by at least one processor causes the processor to partition a preamble signature space into groups, each group corresponding to a sector of a plurality of sectors associated with a base station, generate a preamble signature partition list based on the partitioned preamble signature space, and transmit the preamble signature partition list to the base station. According to one aspect, the instructions which when executed by the processor further cause the processor to generate a multi-sector common enhanced uplink dedicated channel (E-DCH) system information resource list that includes channel code information of channels that facilitate uplink transmissions, the channel code information associated with the plurality of sectors of the base station, and transmit the multi-sector common E-DCH system information resource list to the base station. According to another aspect, the instructions which when executed by the processor further cause the processor to generate at least one predefined power threshold value used to determine whether to enable a user equipment in communication with the base station to engage in softer handover between two or more sectors of the plurality of sectors associated with the base station.

These and other aspects of the disclosure will become more fully understood upon a review of the detailed description, which follows.

BRIEF DESCRIPTION OF THE DRAWINGS

FIGS. 8A, 8B, and 8C illustrate a multi-sector common E-DCH system information resource list associated with a network environment.

FIG. 9 illustrates a preamble signature partition list that includes sixteen (16) preamble signatures.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
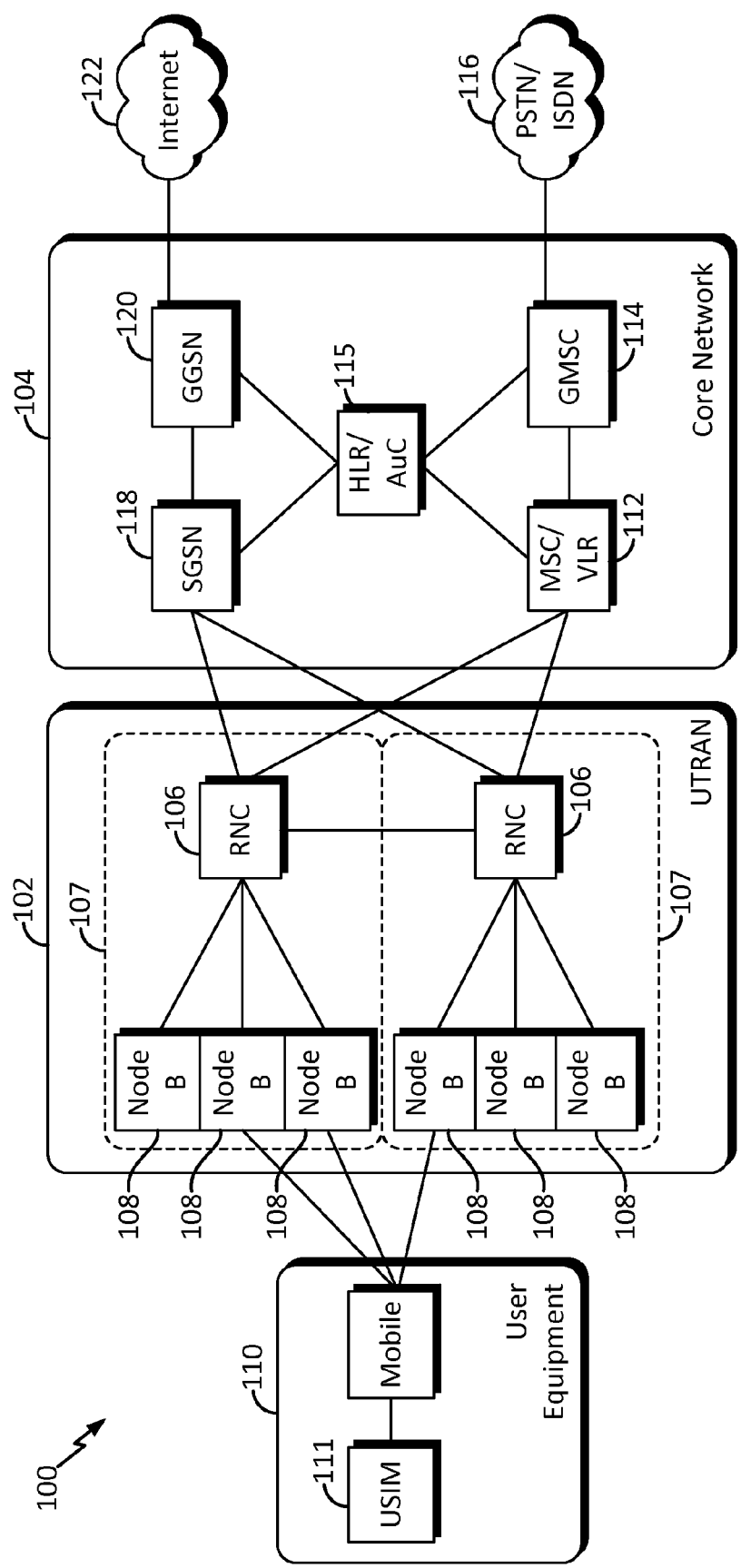
FIG. 1 illustrates a Universal Mobile Telecommunications System (UMTS) system.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a Universal Mobile Telecommunications System (UMTS) system 100. A UMTS network includes three interacting domains: a core network 104, a radio access network (RAN) (e.g., the UMTS Terrestrial Radio Access Network (UTRAN) 102), and a user equipment (UE) 110. Among several options available for a UTRAN 102, in this example, the illustrated UTRAN 102 may employ a W-CDMA air interface for enabling various wireless services including telephony, video, data, messaging, broadcasts, and/or other services. The UTRAN 102 may include a plurality of Radio Network Subsystems (RNSs) such as an RNS 107, each controlled by a respective Radio Network Controller (RNC) such as an RNC 106. Here, the UTRAN 102 may include any number of RNCs 106 and RNSs 107 in addition to the illustrated RNCs 106 and RNSs 107. The RNC 106 is an apparatus responsible for, among other things, assigning, reconfiguring, and releasing radio resources within the RNS 107. The RNC 106 may be interconnected to other RNCs (not shown) in the UTRAN 102 through various types of interfaces such as a direct physical connection, a virtual network, or the like using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 108 are shown in each RNS 107; however, the RNSs 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 110 may further include a universal subscriber identity module (USIM) 111, which contains a user's subscription information to a network. For illustrative purposes, one UE 110 is shown in communication with a number of the Node Bs 108. The downlink (DL), also called the forward link, refers to the communication link from a Node B 108 to a UE 110 and the uplink (UL), also called the reverse link, refers to the communication link from a UE 110 to a Node B 108.

The core network 104 can interface with one or more access networks, such as the UTRAN 102. As shown, the core network 104 is a UMTS core network. However, as those skilled in the art will recognize, the various concepts presented throughout this disclosure may be implemented in a RAN, or other suitable access network, to provide UEs with access to types of core networks other than UMTS networks.

The illustrated UMTS core network 104 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR, and AuC may be shared by both of the circuit-switched and packet-switched domains.

In the illustrated example, the core network 104 supports circuit-switched services with a MSC 112 and a GMSC 114. In some applications, the GMSC 114 may be referred to as a media gateway (MGW). One or more RNCs, such as the RNC 106, may be connected to the MSC 112. The MSC 112 is an apparatus that controls call setup, call routing, and UE mobility functions. The MSC 112 also includes a visitor location register (VLR) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) 115 containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR 115 to determine the UE's location and forwards the call to the particular MSC serving that location.

The illustrated core network 104 also supports packet-switched data services with a serving GPRS support node (SGSN) 118 and a gateway GPRS support node (GGSN) 120. General Packet Radio Service (GPRS) is designed to provide packet-data services at speeds higher than those available with standard circuit-switched data services. The GGSN 120 provides a connection for the UTRAN 102 to a packet-based network 122. The packet-based network 122 may be the Internet, a private data network, or some other suitable packet-based network. The primary function of the GGSN 120 is to provide the UEs 110 with packet-based network connectivity. Data packets may be transferred between the GGSN 120 and the UEs 110 through the SGSN 118, which performs primarily the same functions in the packet-based domain as the MSC 112 performs in the circuit-switched domain.

Figure 2:
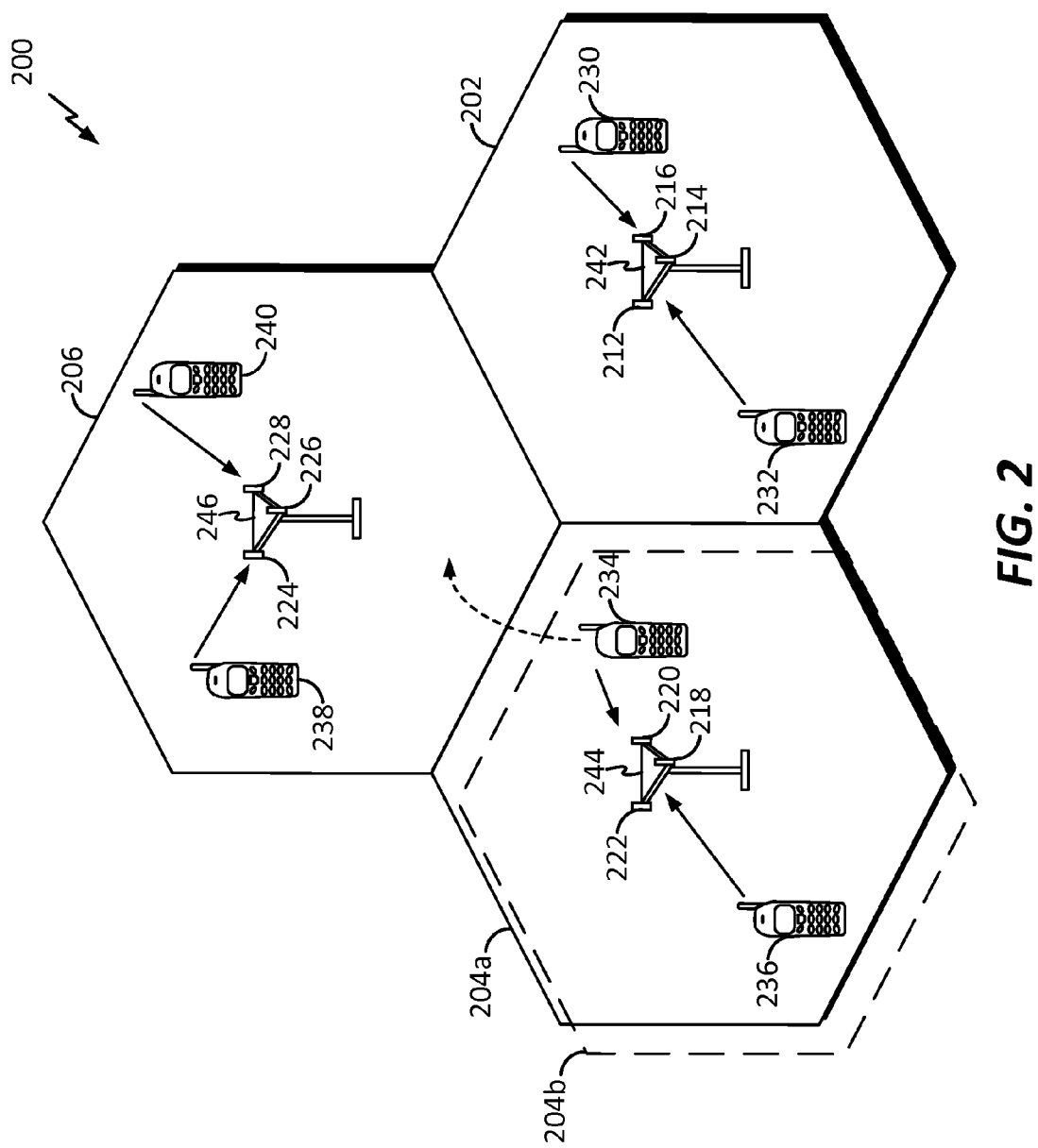
FIG. 2 illustrates a simplified schematic illustration of a radio access network.

The UTRAN 102 is one example of a radio access network (RAN) that may be utilized in accordance with the present disclosure. Referring to FIG. 2, by way of example and without limitation, a simplified schematic illustration of a RAN 200 in a UTRAN architecture is illustrated. The system includes multiple cellular regions (cells), including cells 202, 204, and 206, each of which may include one or more sectors. Cells may be defined geographically (e.g., by coverage area) and/or may be defined in accordance with a frequency, scrambling code, etc. That is, the illustrated geographically-defined cells 202, 204, and 206 may each be further divided into a plurality of cells, e.g., by utilizing different scrambling codes. For example, cell 204*a* may utilize a first scrambling code, and cell 204*b*, while in the same geographic region and served by the same Node B 244, may be distinguished by utilizing a second scrambling code.

In a cell that is divided into sectors, the multiple sectors within a cell can be formed by groups of antennas with each antenna responsible for communication with UEs in a portion of the cell. For example, in cell 202, antenna groups 212, 214, and 216 may each correspond to a different sector. In cell 204, antenna groups 218, 220, and 222 may each correspond to a different sector. In cell 206, antenna groups 224, 226, and 228 may each correspond to a different sector.

The cells 202, 204, and 206 may include several UEs that may be in communication with one or more sectors of each cell 202, 204, or 206. For example, UEs 230 and 232 may be in communication with Node B 242, UEs 234 and 236 may be in communication with Node B 244, and UEs 238 and 240 may be in communication with Node B 246. Here, each Node B 242, 244, and 246 may be configured to provide an access point to a core network 104 (see FIG. 1) for all the UEs 230, 232, 234, 236, 238, and 240 in the respective cells 202, 204, and 206. Additionally, in 3GPP standards, a "cell" may be considered a sector operating at a specific carrier frequency.

During a call with a source cell, or at any other time, the UE 236 may monitor various parameters of the source cell as well as various parameters of neighboring cells. Further, depending on the quality of these parameters, the UE 236 may maintain communication with one or more of the neighboring cells. During this time, the UE 236 may maintain an Active Set, that is, a list of cells to which the UE 236 is simultaneously connected (i.e., the UTRAN cells that are currently assigning a downlink dedicated physical channel DPCH or fractional downlink dedicated physical channel F-DPCH to the UE 236 may constitute the Active Set).

The UTRAN air interface may be a spread spectrum Direct-Sequence Code Division Multiple Access (DS-CDMA) system, such as one utilizing the W-CDMA standards. The spread spectrum DS-CDMA spreads user data through multiplication by a sequence of pseudorandom bits called chips. The W-CDMA air interface for the UTRAN 102 is based on such DS-CDMA technology and additionally calls for a frequency division duplexing (FDD). FDD uses a different carrier frequency for the uplink (UL) and downlink (DL) between a Node B 108 and a UE 110. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface or any other suitable air interface.

Figure 3:
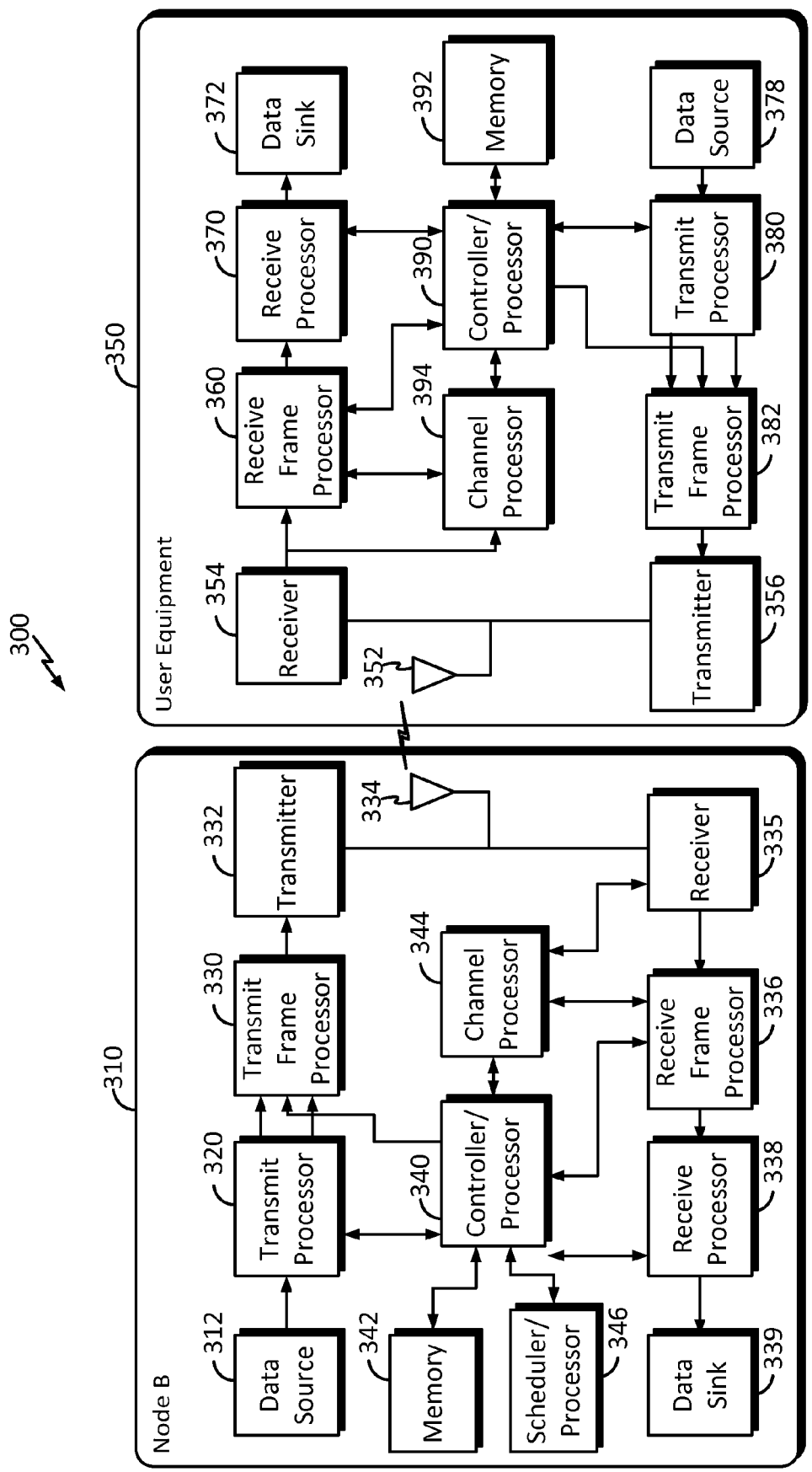
FIG. 3 is a block diagram of a Node B in communication with a user equipment.

FIG. 3 is a block diagram of an exemplary Node B 310 in communication with an exemplary UE 350, where the Node B 310 may be the Node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback from the UE 350. The symbols generated by the transmit processor 320 are provided to a transmit frame processor 330 to create a frame structure. The transmit frame processor 330 creates this frame structure by multiplexing the symbols with information from the controller/processor 340, resulting in a series of frames. The frames are then provided to a transmitter 332, which provides various signal conditioning functions including amplifying, filtering, and modulating the frames onto a carrier for downlink transmission over the wireless medium through antenna 334. The antenna 334 may include one or more antennas, for example, including beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides information from the frames to a channel processor 394 and the data, control, and reference signals to a receive processor 370. The receive processor 370 then performs the inverse of the processing performed by the transmit processor 320 in the Node B 310. More specifically, the receive processor 370 descrambles and despreads the symbols, and then determines the most likely signal constellation points transmitted by the Node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the Node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the Node B 310 or from feedback contained in the midamble transmitted by the Node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with information from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the Node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides information from the frames to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the Node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the Node B 310 and the UE 350, respectively. A scheduler/processor 346 at the Node B 310 may be used to allocate resources to the UEs and schedule downlink and/or uplink transmissions for the UEs.

In any wireless telecommunication system, the communication protocol architecture may take on various forms depending on the particular application. For example, in a 3GPP UMTS system, the signaling protocol stack is divided into a Non-Access Stratum (NAS) and an Access Stratum (AS). The NAS provides the upper layers, for signaling between the UE and the core network, and may include circuit switched and packet switched protocols. The AS provides the lower layers, for signaling between the UTRAN and the UE, and may include a user plane and a control plane. Here, the user plane or data plane carries user traffic, while the control plane carries control information (i.e., signaling).

Figure 4:
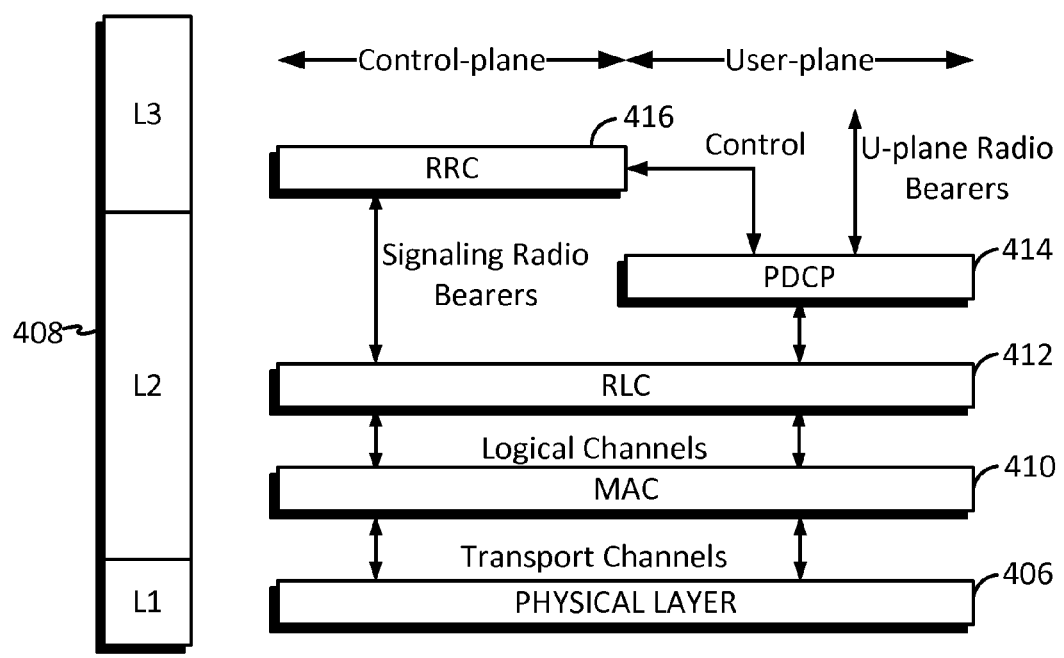
FIG. 4 illustrates a communications protocol stack having three layers.

Turning to FIG. 4, the AS is shown with three layers: Layer 1, Layer 2, and Layer 3. Layer 1 is the lowest layer and implements various physical layer signal processing functions. Layer 1 will be referred to herein as the physical layer 406. The data link layer, called Layer 2 408, is above the physical layer 406 and is responsible for the link between the UE and Node B over the physical layer 406. At Layer 3, the RRC layer 416 handles the control plane signaling between the UE and the UTRAN. RRC layer 416 includes a number of functional entities for routing higher layer messages, handling broadcasting and paging functions, establishing and configuring radio bearers, etc.

As determined by the RRC layer 416, the UE can be in one of several RRC states. RRC states include an IDLE mode and a connected mode. The IDLE mode has the lowest energy consumption, while the connected mode includes several intermediate levels of stand-by states such as URA_PCH, Cell_PCH, and Cell_FACH. RRC connected mode further includes a Cell DCH_state, in which a dedicated channel is provided for highest rates of data transmission. The UE can change its RRC state depending on call or connection activity, entering into lower and lower states when the UE is inactive. The stand-by states provide for different trade-offs between factors such as network capacity, call set-up times, battery time, and data speeds. The IDLE state saves battery power but provides little wireless connectivity.

In the illustrated air interface, the L2 layer 408 is split into sublayers. In the control plane, the L2 layer 408 includes two sublayers: a medium access control (MAC) sublayer 410 and a radio link control (RLC) sublayer 412. In the user plane, the L2 layer 408 additionally includes a packet data convergence protocol (PDCP) sublayer 414. Although not shown, the UE may have several upper layers above the L2 layer 408 including a network layer (e.g., IP layer) that is terminated at a PDN gateway on the network side and an application layer that is terminated at the other end of the connection (e.g., far end UE, server, etc.). The PDCP sublayer 414 provides multiplexing between different radio bearers and logical channels. The PDCP sublayer 414 also provides header compression for upper layer data packets to reduce radio transmission overhead, security by ciphering the data packets, and handover support for UEs between Node Bs.

The RLC sublayer 412 generally supports an acknowledged mode (AM) (where an acknowledgment and retransmission process may be used for error correction), an unacknowledged mode (UM), and a transparent mode for data transfers, and provides segmentation and reassembly of upper layer data packets and reordering of data packets to compensate for out-of-order reception due to a hybrid automatic repeat request (HARQ) at the MAC layer. In the acknowledged mode, RLC peer entities such as an RNC and a UE may exchange various RLC protocol data units (PDUs) including RLC Data PDUs, RLC Status PDUs, and RLC Reset PDUs, among others. In the present disclosure, the term "packet" may refer to any RLC PDU exchanged between RLC peer entities. The MAC sublayer 410 provides multiplexing between logical and transport channels. The MAC sublayer 410 is also responsible for allocating the various radio resources (e.g., resource blocks) in one cell among the UEs. The MAC sublayer 410 is also responsible for HARQ operations.

A high speed packet access (HSPA) air interface includes a series of enhancements to the 3G/W-CDMA air interface between the UE 110 and the UTRAN 102 (referring again to FIG. 1), facilitating greater throughput and reduced latency for users. Among other modifications over prior standards, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink or EUL). 3GPP Release 5 specifications introduced downlink enhancements referred to as HSDPA. 3GPP Release 6 specifications introduced uplink enhancements referred to as Enhanced Uplink (EUL) or High Speed Uplink Packet Access (HSUPA). EUL utilizes as its transport channel the EUL Dedicated Channel (E-DCH). The E-DCH is transmitted in the uplink together with Release 99 DCH.

The E-DCH is implemented by physical channels including the E-DCH Dedicated Physical Data Channel (E-DPDCH) and the E-DCH Dedicated Physical Control Channel (E-DPCCH). In addition, HSUPA relies on additional physical channels including the Fractional Dedicated Physical Channel (F-DPCH), E-DCH Hybrid Automatic Repeat Request (HARQ) Indicator Channel (E-HICH), the E-DCH Absolute Grant Channel (E-AGCH), and the E-DCH Relative Grant Channel (E-RGCH).

For example, F-DPCH may carry power control commands. F-DPCH aims to reduce the need to reserve the downlink code space for DCHs, and is intended to be used when packet-switched services are in use. The E-HICH indicates in the downlink direction whether a packet has been correctly received in the uplink by the Node B. The function of the E-RGCH is either to increase or decrease the uplink transmission rate based on the scheduler decisions. The relative grants transmitted effectively control the gain factors to be used, which then map in practice to a particular data rate or rates allowed for the device.

As described above, one of the RRC states for a UE in a UMTS network is called Cell_FACH. In Cell-FACH the UE continuously monitors the forward access channel (FACH). Cell_FACH may be used for transmissions of relatively small amounts of data on the downlink. Moreover, there may be no dedicated physical channel allocated to the UE in Cell_FACH. Within Cell_FACH, uplink transmissions are allowed by a UE following a random access procedure, as described below.

A conventional random access procedure, which may be initiated while a UE is in the Cell_FACH state, may be largely managed by the MAC entities 410 at the UE 350 and the Node B 310. As described below, the random access procedure utilizes, among others, channels that include the broadcast channel (BCH), the random access channel (RACH), and the acquisition indicator channel (AICH).

The BCH is a transport channel transmitted by the Node B 310, which carries broadcast information directed to any mobile in listening range. The broadcast information may be specific to a particular cell or may concern the network. Among other information, the broadcast information may include a list of available RACH sub-channels and available scrambling codes and signatures for RACH use.

The RACH is a transport channel generally used by the UE 350 to carry an access attempt and initiate a call with the network, register a terminal to the network after powering on, and/or perform a location update after moving from one location to another. That is, the RACH may provide common uplink signaling messages, and also carry dedicated uplink signaling and user information from a UE operating in a Cell_FACH state. At the physical layer, the RACH maps to the physical random access channel (PRACH).

The uplink PRACH carries the RACH information which is transmitted by the UE 350 during registrations or Node B 310 originated calls. The PRACH is composed a preamble portion and a message portion. Prior to transmitting the message portion, the PRACH transmits the preamble portion. The PRACH preamble consists of a preamble signature sequence that includes a preamble signature having a length of 16 chips. The preamble signature is spread with a spreading sequence having a spreading factor of 256 that results in a PRACH preamble signature sequence having a length of 4096 chips.

That is, the preamble signature sequence consists of the preamble signature repeated 256 times. There are a maximum of 16 available preamble signatures that the UE can use for its PRACH preamble.

The acquisition indicator channel (AICH) is transmitted by the Node B 310 to indicate the reception of the access attempt. That is, once the base station detects a PRACH preamble, the Node B 310 generally transmits the AICH including the same signature sequence as used on the PRACH. The AICH generally includes an information element called the acquisition indicator (AI), which may include a positive acknowledgment (ACK) or a negative acknowledgment (NACK) indicating an acceptance or a rejection of the received access attempt, respectively. The AICH may further include an extended acquisition indicator (E-AI), as described in further detail below, for providing resource allocation information to the UE in addition to the positive or negative acknowledgment.

Figure 5:
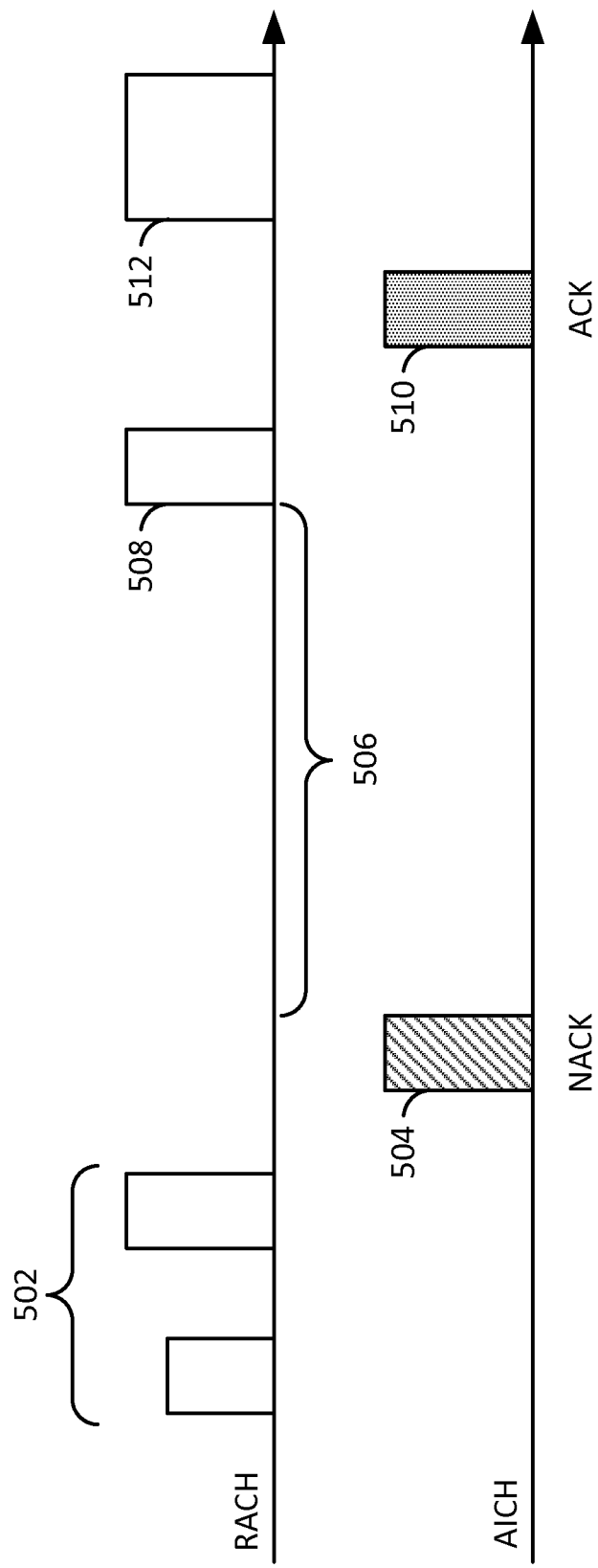
FIG. 5 illustrates a random access procedure in a UTRA network in accordance with 3GPP Release-99 specifications.

FIG. 5 illustrates a typical random access procedure in a UTRA network in accordance with 3GPP Release-99 specifications (referred to herein as a Rel-99). Here, the random access procedure begins with a UE 350 decoding the BCH to determine the available RACH sub-channels and their scrambling codes and preamble signatures. The UE 350 may then randomly select one of the RACH sub-channels from among the group of sub-channels that the UE is allowed to use. The preamble signature may also be selected randomly from among the preamble signatures available.

Referring to FIG. 5, after setting the PRACH power level, the UE 350 transmits the PRACH preamble 502 with the selected scrambling code and preamble signature. In the illustrated example, the PRACH preamble includes two transmissions with a ramping of the power in each transmission not acknowledged by the network. When the PRACH preamble 502 is detected, the Node B 310 may respond with an acquisition indicator (AI) 504 indicating a negative acknowledgment on the AICH. Here, the UE 350 stops its transmission, re-trying again later (if the number of access attempts corresponding the persistence value has not been exhausted) after waiting for a wait time 506 equal to a selected back-off period. After waiting, if the number of attempts allowed according to the persistence value for the UE 350 has not been exhausted, the UE 350 may transmit a subsequent PRACH preamble 508 on the PRACH. In this instance, the access attempt is met with another acquisition indicator 510 indicating a positive acknowledgment transmitted by the Node B 310 on the AICH. Here, the AICH includes the same preamble signature sequence transmitted by the UE. Once the UE 350 detects the AICH acknowledgment, it may transmit the message part 512 of the RACH transmission. That is, when a legacy Rel-99 UE is in the Cell_FACH state, uplink data may be transmitted utilizing a Rel-99 PRACH message at a relatively low data rate.

This Rel-99 PRACH message can be useful for signaling small amounts of user data. However, since the data rate for Rel-99 PRACH is typically below 10 kbps, enabling use of the HSPA transport and physical channels in the Cell_FACH state would improve performance. For this and other reasons, more recent specifications introduced the Enhanced RACH. Defined in Release 8 specifications, Enhanced RACH enables E-DCH resources to be utilized by a UE for uplink transmissions while in Cell_FACH. Transmission on the E-DCH provides a higher data rate than that available utilizing a Rel-99 PRACH message at the expense of a larger amount of power required to make the transmission.

To enable Enhanced RACH, certain aspects of the random access procedure described above and illustrated in FIG. 5 are modified. For example, the E-DCH resources to be used in Cell_FACH are broadcast to all UEs in the cell and/or sector on the BCH as a common E-DCH system information resource list. UEs that are capable of Enhanced RACH can utilize this resource list for subsequent access attempts.

In a UE capable of Enhanced RACH, the transmission of the PRACH preamble 502, 508 includes a preamble signature configured to indicate that the UE seeks to transmit an E-DCH transmission. In response, the Node B may transmit a corresponding AI (504, 510) or E-AI that includes a resource index value to indicate the E-DCH resources allocated to the UE. Here, the E-AI is an extended acquisition indicator that, according to Release 8 or later 3GPP specifications including 3GPP TS 25.214, may provide E-DCH resource configuration information for a UE to utilize in an uplink transmission in the Cell_FACH state. Thus, rather than transmitting the RACH message 512 as described above, in Enhanced RACH the UE transmits uplink data utilizing the E-DCH resources indicated as available to the UE in the AICH transmission.

Figure 6:
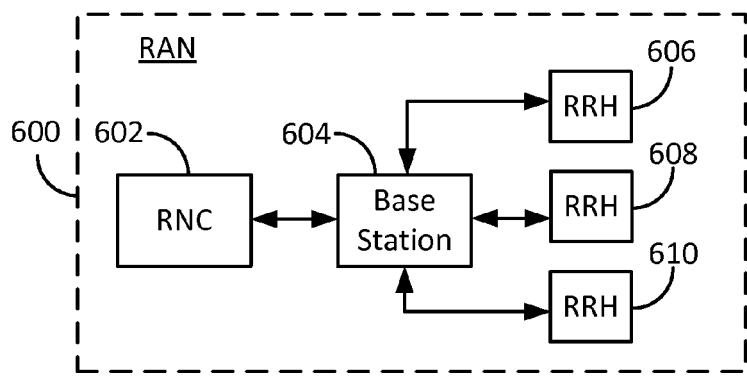
FIG. 6 illustrates a radio access network (RAN).

FIG. 6 illustrates an exemplary radio access network (RAN) 600 according to one aspect of the present disclosure. The RAN 600 may be, for example, a UMTS Terrestrial Radio Access Network (UTRAN) that may include, among other components, a radio network controller (RNC) 602 and a distributed base station (e.g., a UMTS Node B, evolved Node B (eNode B), base transceiver station, etc.) 604 having a plurality of remote radio heads (RRHs) 606, 608, 610. The RNC 602 is a network node that is communicatively coupled to the distributed base station 604. Each RRH 606, 608, 610 is communicatively coupled to the base station 604 to provide signal coverage to a plurality of UEs (not shown in FIG. 6). In one aspect of the disclosure, the RNC 602 and the base station 604 may be included within a single network node, such as an Long Term Evolution (LTE) eNode B.

Figure 7:
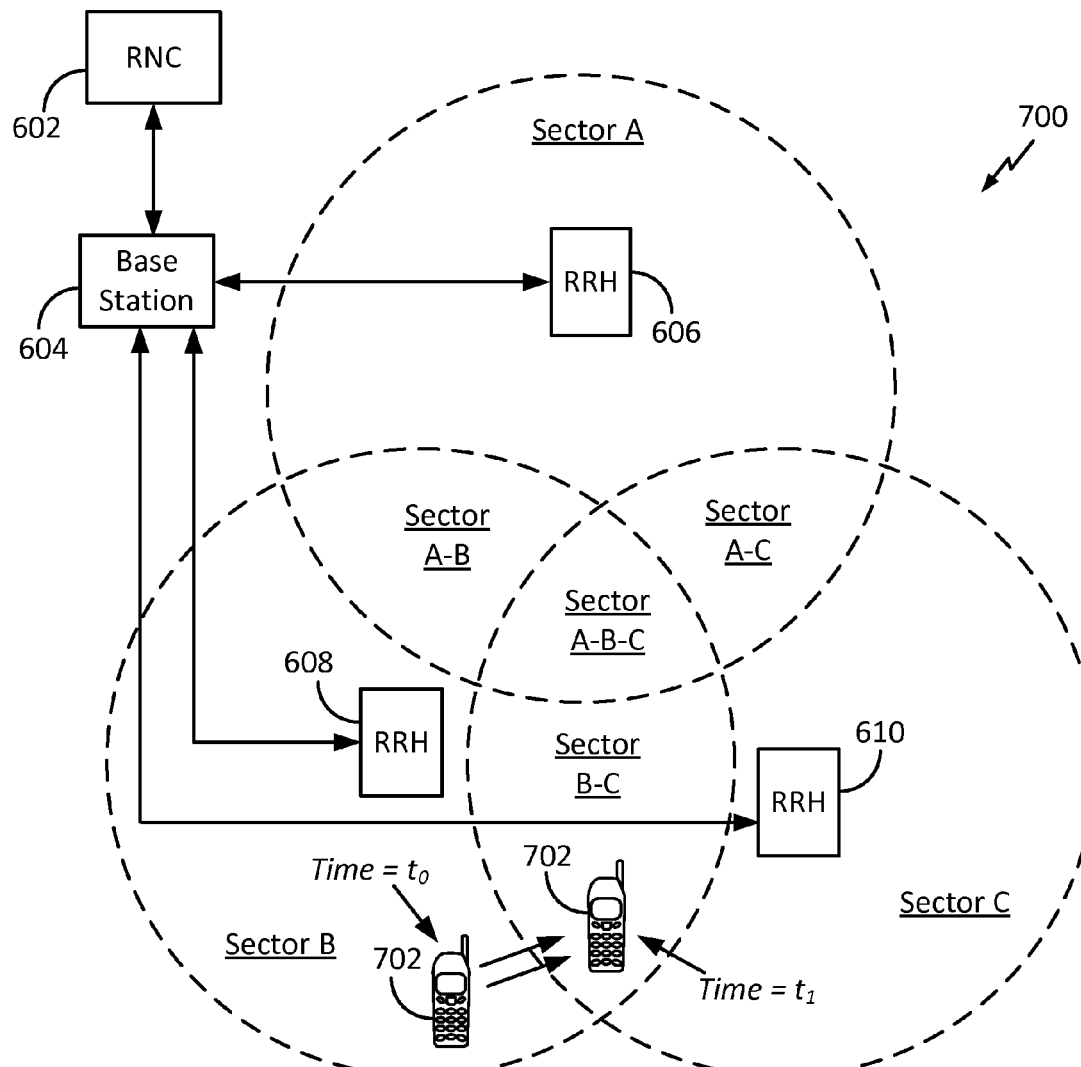
FIG. 7 illustrates a portion of a network environment that allows softer handover for UEs operating in non-dedicated channel states.

FIG. 7 illustrates a portion of an exemplary network environment 700 that allows softer handover for UEs operating in non-dedicated channel states, such as Cell_FACH, according to one aspect of the disclosure. The network environment 700 includes the RAN 600 shown in FIG. 6 and a UE 702 that communicates with other UEs (not shown) in the network via the RAN 600. The first RRH 606 provides network signal coverage within sector A, a second RRH 608 provides coverage within sector B, and a third RRH 610 provides coverage within sector C.

In the illustrated example, sectors A, B, and C overlap with one another creating zones where a UE may obtain network connectivity through two or three RRHs 606, 608, 610 at the same time. For example, an overlap between sectors A and B (herein referred to as "sector A-B") provides a UE network connectivity through the first RRH 606, the second RRH 608, or both RRHs 606, 608 at the same time. Similarly, an overlap between sectors A and C (herein referred to as "sector A-C") provides a UE network connectivity through the first RRH 606, the third RRH 610, or both RRHs 606, 610 at the same time. An overlap between sectors B and C (herein referred to as "sector B-C") provides a UE network connectivity through the second RRH 608, the third RRH 610, or both RRHs 608, 610 at the same time. Finally, an overlap between sectors A, B, and C (herein referred to as "sector A-B-C") provides a UE network connectivity through the first RRH 606, the second RRH 608, the third RRH 610, or any combination of the RRHs 606, 608, 610 at the same time. In the illustrated example, the sectors A, B, and C may operate at the same carrier frequency (i.e., they are associated with the same carrier frequency). However, according to other aspects of the disclosure the sectors A, B, and C need not operate at the same carrier frequency.

As just one example, the UE 702 is illustrated as positioned within sector B at time $t_0$, and then sometime later at time $t_1$, the UE 612 moves within sector B-C. Once the UE 702 is within sector B-C, it may desire to alleviate interference by participating in a softer handover so that it is connected to the network environment 700 through both the second and third RRHs 608, 610. Notably, the UE 702 may desire to engage in a softer handover despite being in a non-dedicated channel state, such as Cell_FACH.

FIGS. 8A, 8B, and 8C illustrate an exemplary multi-sector common E-DCH system information resource list 800 associated with the network environment 700. The resource list 800 may include, among other things, the channel codes for primary scrambling codes, F-DPCH, E-HICH, E-RGCH that are to be used for a corresponding resource index value within a specific sector of the base station 604. In the illustrated example, the resource list 800 includes seven (7) tables that each correspond to one of the seven (7) sectors of the base station 604. A table 802 corresponds to channel code values to be used if the UE 702 is exclusively within sector A. Similarly, another table 804 specifies the channel codes to be used if the UE 702 is exclusively within sector B, and the table 806 specifies the channel codes if the UE 702 is exclusively within sector C. A table 808 specifies the channel codes to be used if the UE 702 is within the signal coverage of both sectors A and B, and engages in a softer handover with these sectors. Therefore, the table 808 lists the PSC, F-DPCH, E-HICH, E-RGCH channel codes to be used for sector A and separately for sector B. A single resource index value may point to the channel codes to be used for both sectors A and B. Similar to table 808, tables 810 and 812 specify the channel codes to be used if the UE 702 is within the signal coverage of sectors A and C and sectors B and C, respectively. Table 814 specifies the channel codes to be used if the UE 702 is within the signal coverage of all three sectors A, B, and C, and engages in a softer handover with these sectors. It may be appreciated that the number of sectors and tables illustrated in FIGS. 6 and 8, respectively, are merely examples. Other RRH deployments may result in more or less sectors and different resource lists.

Referring to FIG. 8B as an example, a resource index value zero (0) in the table 808 indicates that: the PSC channel codes to be used in sectors A and B are nine (9) and fourteen (14), respectively; the F-DPCH codes to be used in sectors A and B are sixteen (16) and nine (9), respectively; the E-HICH codes to be used in sectors A and B are one hundred twenty-two (122) and ninety-two (92), respectively; and the E-RGCH codes to be used in sectors A and B are forty-eight (48) and forty-two (42), respectively. The illustrated resource list 800 is merely one example, and a multitude of other resource lists having different channel code values are contemplated by this disclosure. For example, other resource lists may include additional channel information not limited to the PSC, F-DPCH, E-HICH, and E-RGCH.

As described above, there are sixteen (16) unique PRACH uplink preamble signatures that can be used by a UE when initiating a random access procedure. FIG. 9 illustrates a preamble signature partition list 900 that includes the sixteen (16) preamble signatures. The partition list 900 divides the preamble signatures into sector groups such that each preamble signature corresponds to a particular sector of the base station 604. The partition list 900 may be a preconfigured list generated by the RNC 602 and distributed to the base station 604 and the UE 702 before random access procedures are initiated by the UEs in the network 700.

In the illustrated example, the partition list 900 indicates that: preamble signatures zero (0) and one (1) correspond to random access attempts by UEs that are exclusively within Sector A; preamble signatures two (2) and three (3) correspond to random access attempts by UEs that are exclusively within Sector B; preamble signatures four (4) and five (5) correspond to random access attempts by UEs that are exclusively within Sector C; preamble signatures six (6), seven (7), and eight (8) correspond to random access attempts by UEs that are exclusively within sector A and B (i.e., sector A-B); preamble signatures nine (9) and ten (10) correspond to random access attempts by UEs that are exclusively within sector A and C (i.e., sector A-C); preamble signatures eleven (11), twelve (12), and thirteen (13) correspond to random access attempts by UEs that are exclusively within sector B and C (i.e., sector B-C); and preamble signatures fourteen (14) and fifteen (15) correspond to random access attempts by UEs that are exclusively within sector A, B, and C (i.e., sector A-B-C). The partition list illustrated in FIG. 9 is merely exemplary, and thus a multitude of partitions among a plurality of sectors is possible.

As one example, if the UE 702 is located within sector B-C and the UE desires to engage in a softer handover with both sectors B and C, then the UE 702 may initiate a random access procedure by transmitting a PRACH communication having a preamble signature eleven (11), twelve (12), or thirteen (13) to the base station 604. The UE may decide on which specific preamble signature to use out of these three at random. Upon receiving the PRACH communication having the preamble signature eleven (11), twelve (12), or thirteen (13), the base station 604 knows that the UE 702 is located within sector B-C and desires to engage in a softer handover with sectors B and C of the base station 604.

Figure 10A:
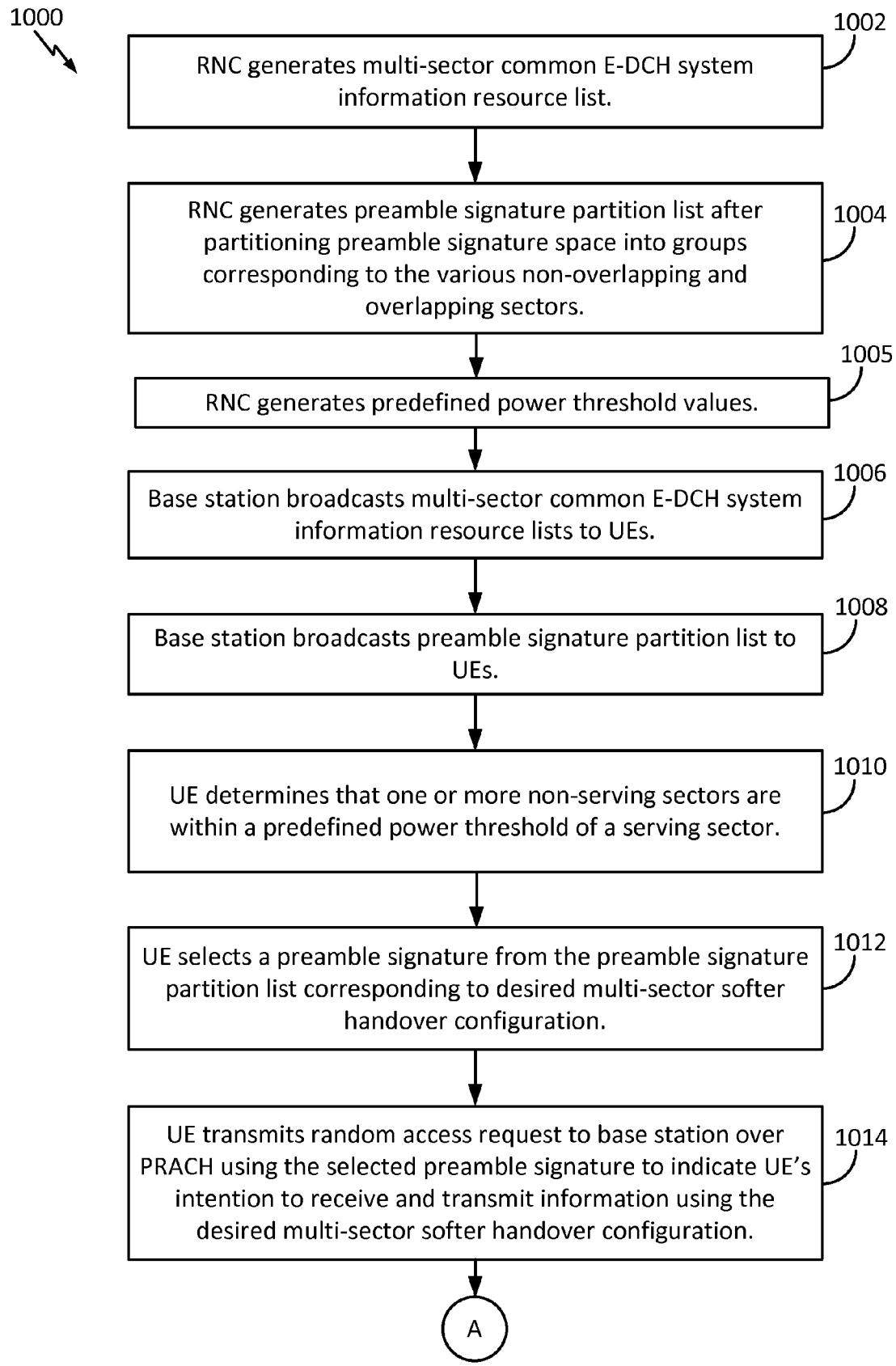
FIGS. 10A and 10B illustrate a flow chart of a process for enabling softer handover by a user equipment in a non-dedicated state, such as Cell_FACH.
Figure 10B:
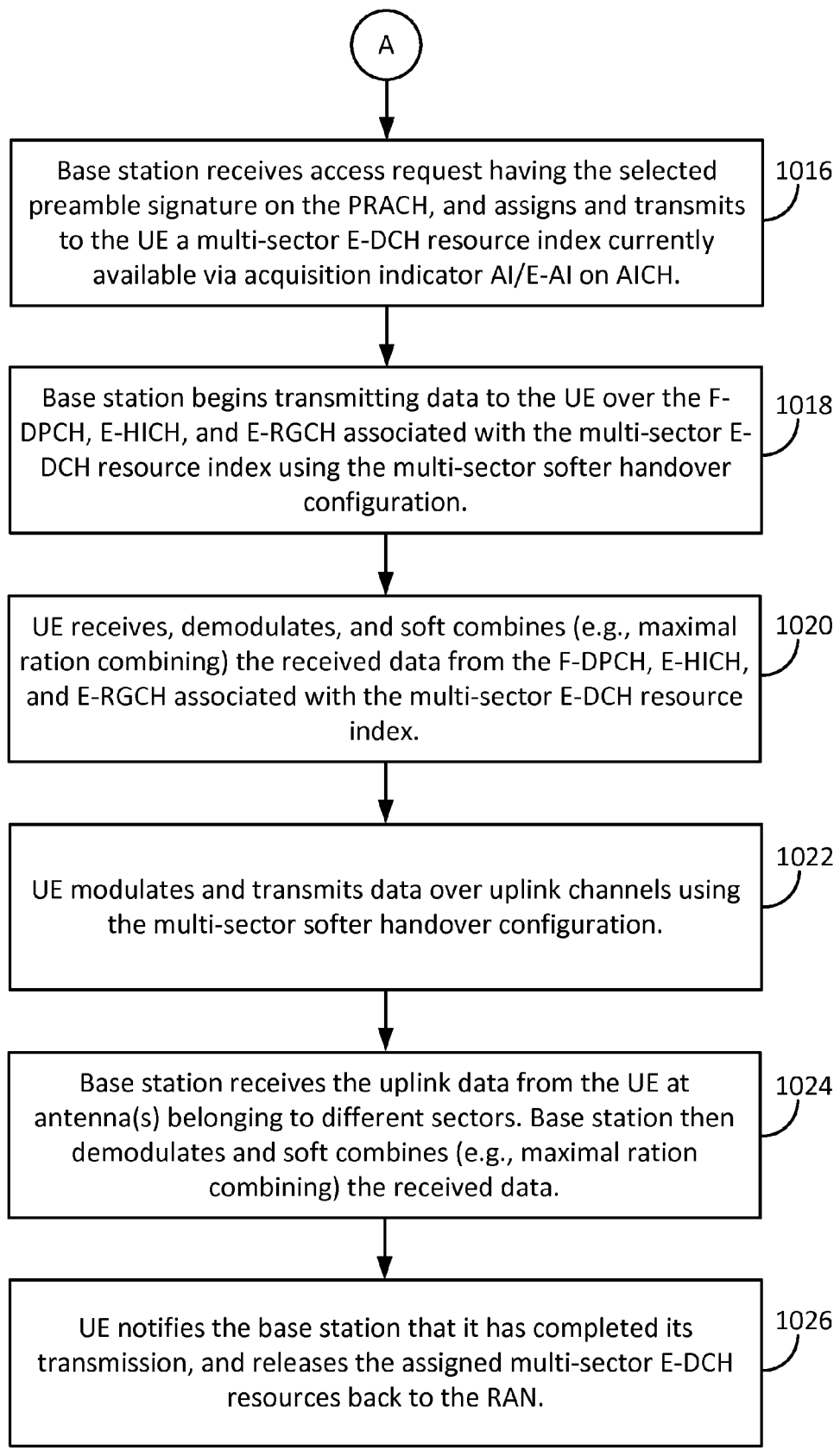

FIGS. 10A and 10B illustrate a flow chart of an exemplary process 1000 for enabling softer handover by a user equipment in a non-dedicated state, such as Cell_FACH, according to one aspect of the disclosure. At step 1002, an RNC 602 of the RAN 600 generates a multi-sector common E-DCH system information resource list (e.g., resource list 800) for the UEs that may be used for softer handover. At step 1004, the RNC 602 generates a preamble signature partition list (e.g., partition list 900) after partitioning the preamble signature space into groups corresponding to the various non-overlapping and overlapping sectors of the base station 604. At step 1005, the RNC 602 may generate predefined power threshold values that the UEs may use to determine whether to engage in a softer handover with one or more non-serving sectors of a base station 604. The predefined power threshold values may be unique and specific to the various softer handover sector configurations (e.g., sector A-B, sector A-C, sector B-C, etc.). For example, the power threshold value to engage in a softer handover configuration including sector A and sector C may be different than the power threshold value needed to engage in softer handover with sector B and sector C.

At steps 1006 and 1008, the base station 604 broadcasts the resource list 800 and the partition list 900, respectively, to the UEs within listening range of the base station 604. The broadcasts may also include the power threshold values generated by the RNC 602. The broadcast may be performed on a broadcast channel such as the BCH, which is a shared channel that any one or more UEs in listening range of the base station 604 may receive. With this broadcast, the base station 604 can communicate to the one or more UEs what resources are available for use for uplink transmissions on the E-DCH. These uplink resources typically include a list of common E-DCH resources that can be used for uplink traffic in Cell_FACH. Further, the base station 604 may communicate to the UEs what resources are available for Rel-99 PRACH use. The base station 604 may first receive the lists 800, 900 from the RNC before broadcasting them.

At step 1010, the user equipment 702 may determine that one or more non-serving sectors (i.e., sectors that are not presently serving the user equipment 702) are within a predefined power threshold of a serving sector (i.e., a sector currently serving the UE 702). That is, the power level of a signal (e.g., a pilot signal, such as the common pilot indicator channel (CPICH)) received at the UE 702 from the one or more non-serving sectors is within a predefined threshold value of the power level of a signal (e.g., a pilot signal, such as the CPICH) presently being received from the serving sector. As discussed above, in one aspect of the disclosure the power threshold value used by the UE 702 may be generated by the RNC 602 and be unique/specific to a particular softer handover sector configuration (e.g., softer handover with sectors A and C may use a threshold value that is different than softer handover with sectors A and B).

Referring to FIG. 7 as an example, the UE 702 may move from sector B to sector B-C at time $t_1$. Upon entering sector B-C, the UE 702 may determine that the CPICH of the third RRH 610 associated with sector C is within X dB of the CPICH of the second RRH 608 associated with sector B, where X dB is less than the predefined threshold value. According to one aspect of the disclosure, the predefined threshold may be equal to or less than twenty (20) dB. Assuming the predefined threshold value is relatively low (e.g., equal to or less than ten (10) dB), the UE 702 effectively determines that the signal power associated with sector C is on the order of the signal power of the sector that it is currently being served by, and thus, softer handover with the non-serving sector (e.g., sector C) may mitigate interference and improve signal quality.

At step 1012, the UE 702 selects a preamble signature from the preamble signature partition list that corresponds to the desired multi-sector softer handover configuration. In this case, the UE 702 desires to engage in softer handover with sectors B and C, and thus, it may select any one of the preamble signatures eleven (11), twelve (12), and thirteen (13). At step 1014, the UE 702 transmits a random access request to the base station 604 over the PRACH using the selected preamble signature to indicate its intention to receive and transmit information to the base station 604 using the desired multi-sector softer handover configuration (e.g., the configuration may be softer handover with sectors B and C). At step 1016, the base station 604 receives the access request message having the selected preamble signature on the PRACH. The base station 604 reads the preamble signature used and understands that the UE 702 desires to engage in softer handover with sectors B and C. The base station 604 assigns and transmits to the UE a multi-sector E-DCH resource index currently available via the acquisition indicator APE-AI on AICH. Thus, in effect the base station 604 dynamically determines which E-DCH resources are currently available and assigns the UE 702 a portion of those resources. The resource index value in the acquisition indicator lets the UE 702 know which E-DCH resources to tune to begin receiving data from the base station 604.

At step 1018, the base station 604 begins transmitting data to the UE 702 over the F-DPCH, E-HICH, and E-RGCH associated with the multi-sector E-DCH resource index value assigned to the UE 702 using the multi-sector softer handover configuration. That is, the base station 604 begins transmitting data over the F-DPCH, E-HICH, and E-RGCH (among possibly other channels) of both sectors B and C. At step 1020, the UE 702 receives, demodulates, and soft combines (e.g., maximal ratio combines) the data received from the F-DPCH, E-HICH, and E-RGCH associated with the multi-sector E-DCH resource index that is transmitted by the base station 604. At step 1022, the UE 702 modulates and transmits data over uplink channels using the multi-sector softer handover configuration. Thus, the UE 702 may transmit to the base station 604 the same raw data stream but using different channel encoding and modulations schemes for sector B and C. At step 1024, the base station 604 receives the uplink data from the UE 702 at antenna(s) belonging to different sectors (e.g., one pair of antenna at sector B and another pair at sector C). The base station then demodulates and soft combines (e.g., maximal ratio combines) the received data. At step 1026, the UE 702 notifies the base station 604 that it has completed its transmission, and releases the assigned multi-sector E-DCH resources back to the RAN 600.

In this fashion, the UE 702 and base station 604 may quickly and efficiently establish a softer handover connection. The described process is efficient because the base station 604 may dynamically assign available E-DCH resources for a plurality of its sectors to the UE 702 immediately after receiving the random access request message. The random access message containing the selected preamble signature quickly informs the base station 604 which sectors the UE 702 desires to establish a softer handover connection with. Since the base station 604 already knows which E-DCH resources are available at not in use at any particular time, the base station 604 can assign the E-DCH resource index to the UE 702 without, for example, having to communicate with the RNC 602. In at least one aspect of the disclosure, the functions performed by the RNC 602 and base station 604 illustrated in FIGS. 10A and 10B may be performed by a single network node, such as an LTE eNode B.

Figure 11A:
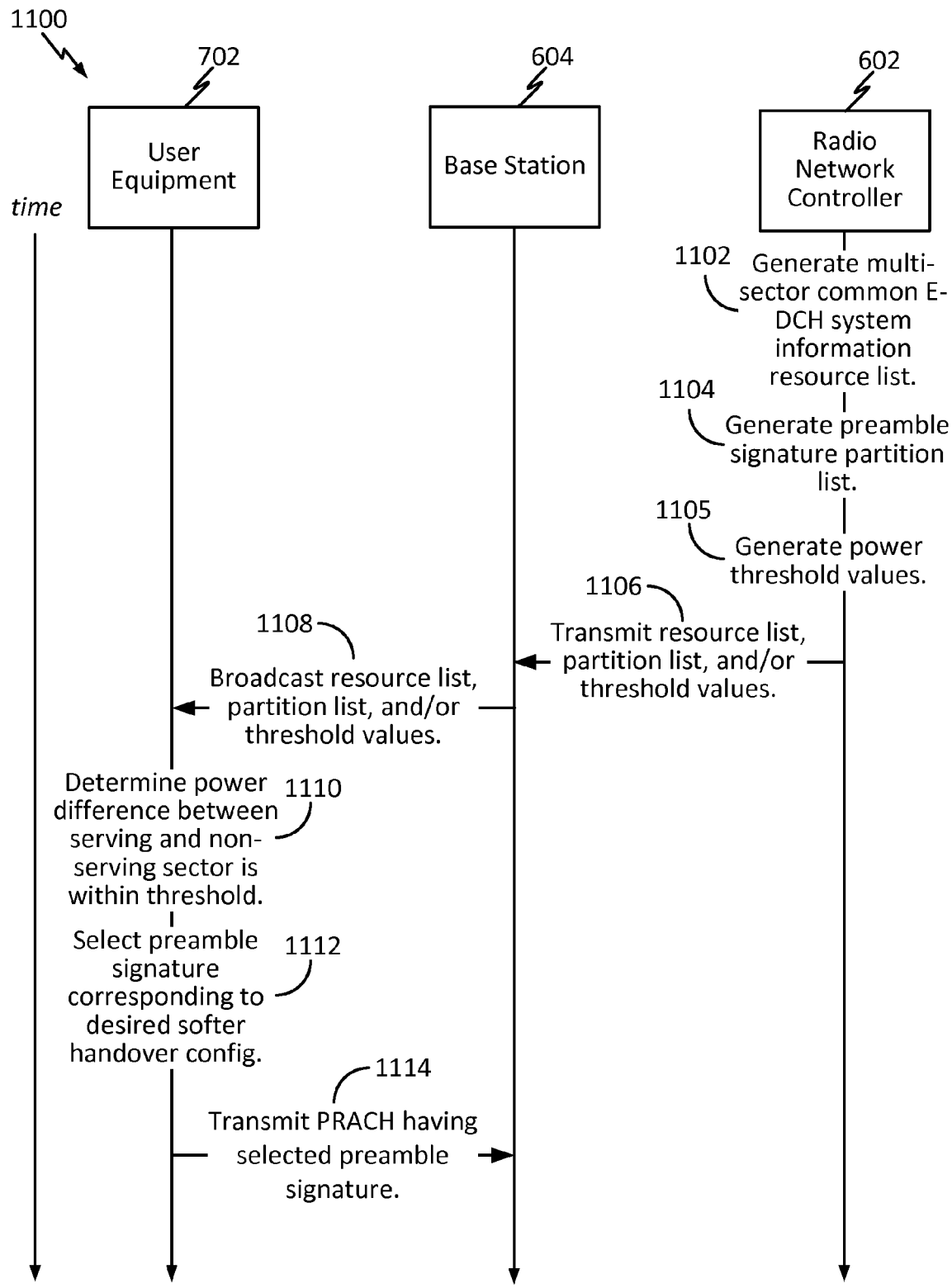
FIGS. 11A, 11B, and 11C illustrate a diagram of a process for enabling softer handover by a user equipment in a non-dedicated state, such as Cell_FACH.
Figure 11B:
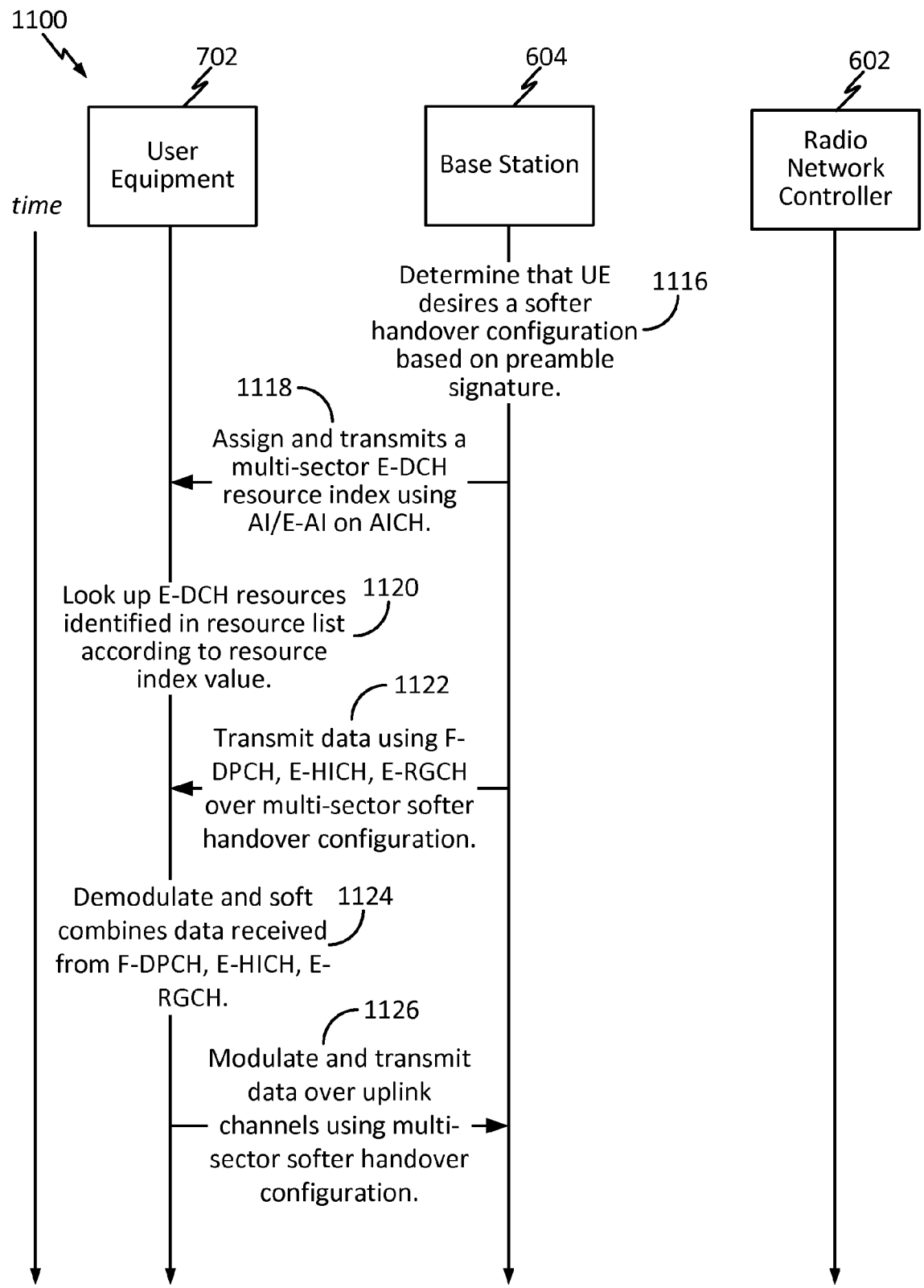
Figure 11C:
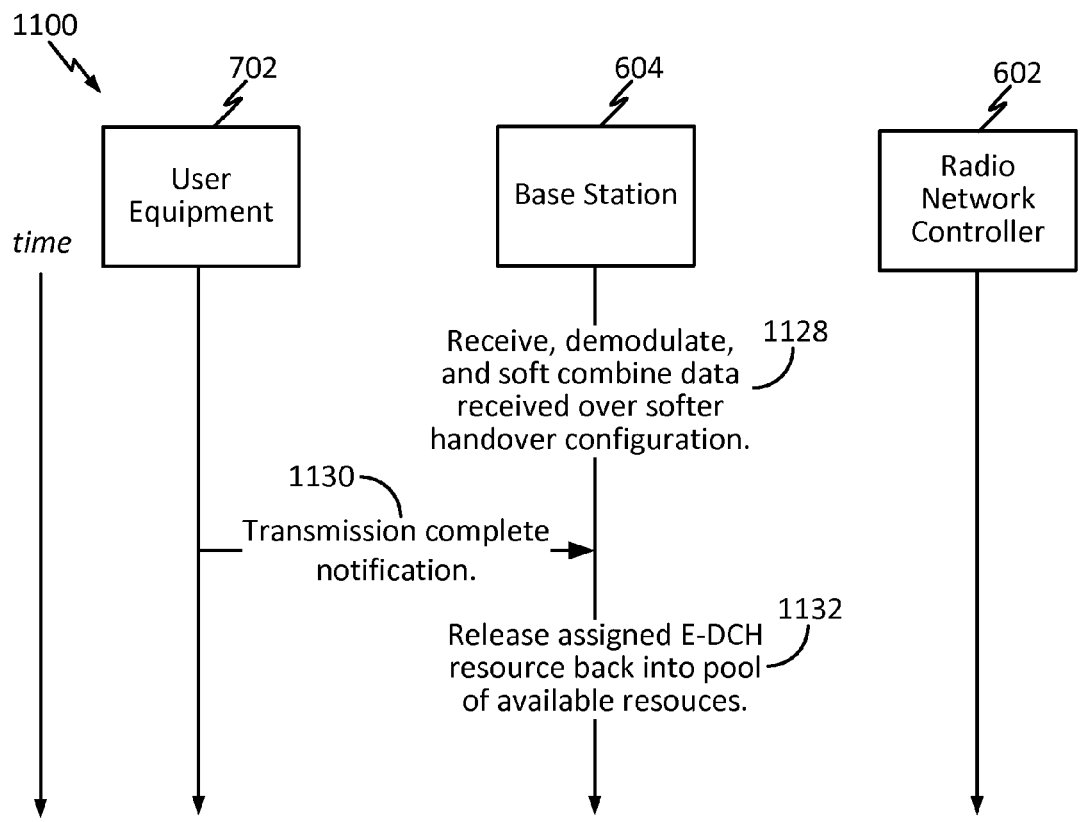

FIGS. 11A, 11B, and 11C illustrate a diagram of an exemplary process 1100 for enabling softer handover by a user equipment in a non-dedicated state, such as Cell_FACH, according to one aspect of the disclosure. At step 1102, the RNC 602 generates a multi-sector common E-DCH system information resource list (e.g., resource list 800) for the UEs that may be used for softer handover. At step 1104, the RNC 602 generates a preamble signature partition list (e.g., partition list 900) after partitioning the preamble signature space into groups corresponding to the various non-overlapping and overlapping sectors of the base station 604. Optionally, at step 1105, the RNC 602 generates a plurality of power threshold values to be used by the UE 702 to determine whether to engage in softer handover with a particular non-serving sector. For example, a first predefined power threshold value may determine whether to enable the UE 702 to engage in softer handover between a first set of sectors (e.g., sectors A and B) of the plurality of sectors associated with the base station 604, and a second predefined power threshold value may determine whether to enable the UE 702 to engage in softer handover between a second different set of sectors (e.g., sectors B and C) of the plurality of sectors associated with the base station 604. At step 1106 the RNC 302 transmits the resource list 800, the partition list 900, and/or the power threshold values, to the base station 604. At step 1108, the base station 604 broadcasts the resource list 800, the partition list 900, and/or the power threshold values to the UEs within listening range of the base station 604.

At step 1110, the user equipment 702 may determine that the difference in power between the serving sector and the non-serving sector is within a specific predefined threshold level. For example, the power level of a signal (e.g., a pilot signal, such as the common pilot indicator channel (CPICH)) received at the UE 702 from the one or more non-serving sectors is within a predefined threshold value of the power level of a signal (e.g., a pilot signal, such as the CPICH) presently being received from the serving sector. In one aspect of the disclosure, the UE 702 may determine that the signal to noise ratio of a signal (e.g., a pilot signal, such as the CPICH) from the non-serving sector is above a predefined threshold level. In another aspect of the disclosure, the UE 702 may determine that the signal to noise ratio of a signal (e.g., a pilot signal, such as the CPICH) from the non-serving sector is within a predefined threshold of the signal to noise ratio of a corresponding signal (e.g., CPICH) received from the serving sector. In one aspect of the disclosure, the RNC 602 generates the predefined power threshold values. In another aspect of the disclosure, the base station 604 generates the predefined power threshold values. In yet another aspect of the disclosure, the UE 702 generates the power threshold values.

At step 1112, the UE 702 selects a preamble signature from the preamble signature partition list that corresponds to the desired multi-sector softer handover configuration. According to one example, the UE 702 desires to engage in softer handover with sectors B and C, and thus, it may select any one of the preamble signatures eleven (11), twelve (12), and thirteen (13). At step 1114, the UE 702 transmits a random access request to the base station 604 over the PRACH using the selected preamble signature to indicate its intention to receive and transmit information to the base station 604 using the desired multi-sector softer handover configuration (e.g., the configuration may be softer handover with sectors B and C). At step 1116, the base station 604 receives the access request message having the selected preamble signature on the PRACH, and determines that the UE 702 desires to engage in softer handover with sectors B and C. At step 1118, the base station 604 assigns and transmits to the UE an available multi-sector E-DCH resource index via the acquisition indicator AI/E-AI on AICH.

At step 1120, the UE 702 looks up the E-DCH resources and primary scrambling codes corresponding to the multi-sector E-DCH resource index value. The UE 702 may then expect to receive data on the channel codes associated with the resource index value. At step 1122, the base station 604 begins transmitting data to the UE 702 over the F-DPCH, E-HICH, and E-RGCH associated with the multi-sector E-DCH resource index value assigned to the UE 702 using the multi-sector softer handover configuration. That is, in the given example, the base station 604 begins transmitting data over the F-DPCH, E-HICH, and E-RGCH (among possibly other channels) of both sectors B and C. At step 1124, the UE 702 receives, demodulates, and soft combines (e.g., maximal ratio combines) the data received from the F-DPCH, E-HICH, and E-RGCH associated with the multi-sector E-DCH resource index that is transmitted by the base station 604. At step 1126, the UE 702 modulates and transmits data over uplink channels using the multi-sector softer handover configuration. Thus, the UE 702 may transmit to the base station 604 the same raw data stream but using different channel encoding and modulations schemes for sector B and C. At step 1128, the base station 604 receives, demodulates, and soft combines the uplink data received from the UE 702. At step 1130, the UE 702 may transmit a notification to the base station 604 indicating that transmission of uplink data over the softer handover configuration is complete. At step 1132, the base station 604 may release the assigned multi-sector E-DCH resources back to the pool of available resources. In at least one aspect of the disclosure, the functions performed by the RNC 602 and base station 604 illustrated in FIGS. 11A, 11B, and 11C may be performed by a single network node, such as an LTE eNode B.

Figure 12:
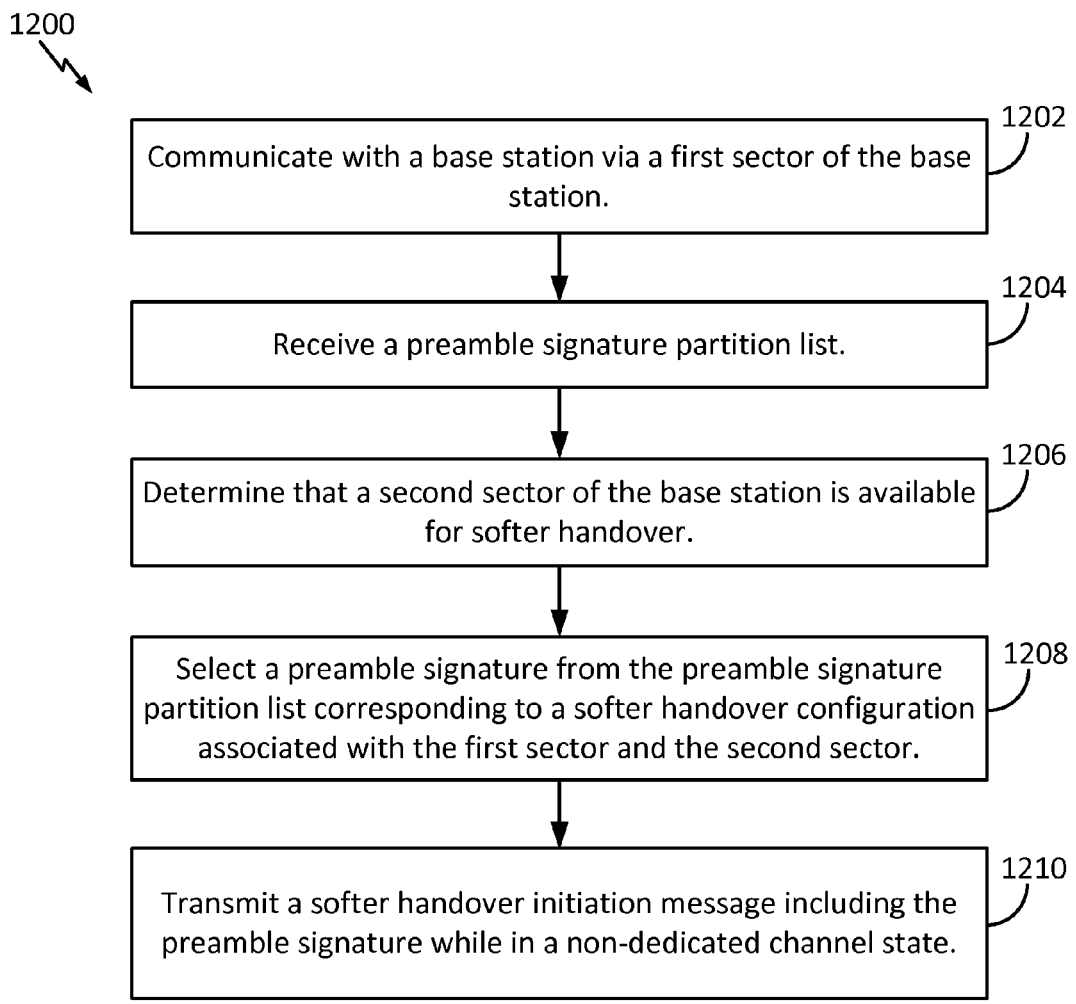
FIG. 12 illustrates a method operational at a user equipment for enabling softer handover while in a non-dedicated channel state.

FIG. 12 illustrates a method 1200 operational at a user equipment for enabling softer handover while in a non-dedicated channel state according to one aspect of the disclosure. At step 1202, the UE communicates with a base station via a first sector of the base station. At step 1204, the UE receives a preamble signature partition list. At step 1206, the UE determines that a second sector of the base station is available for softer handover. At step 1208, the UE selects a preamble signature from the preamble signature partition list corresponding to a softer handover configuration associated with the first sector and the second sector. At step 1210, the UE transmits a softer handover initiation message including the preamble signature while in a non-dedicated channel state.

Figure 13:
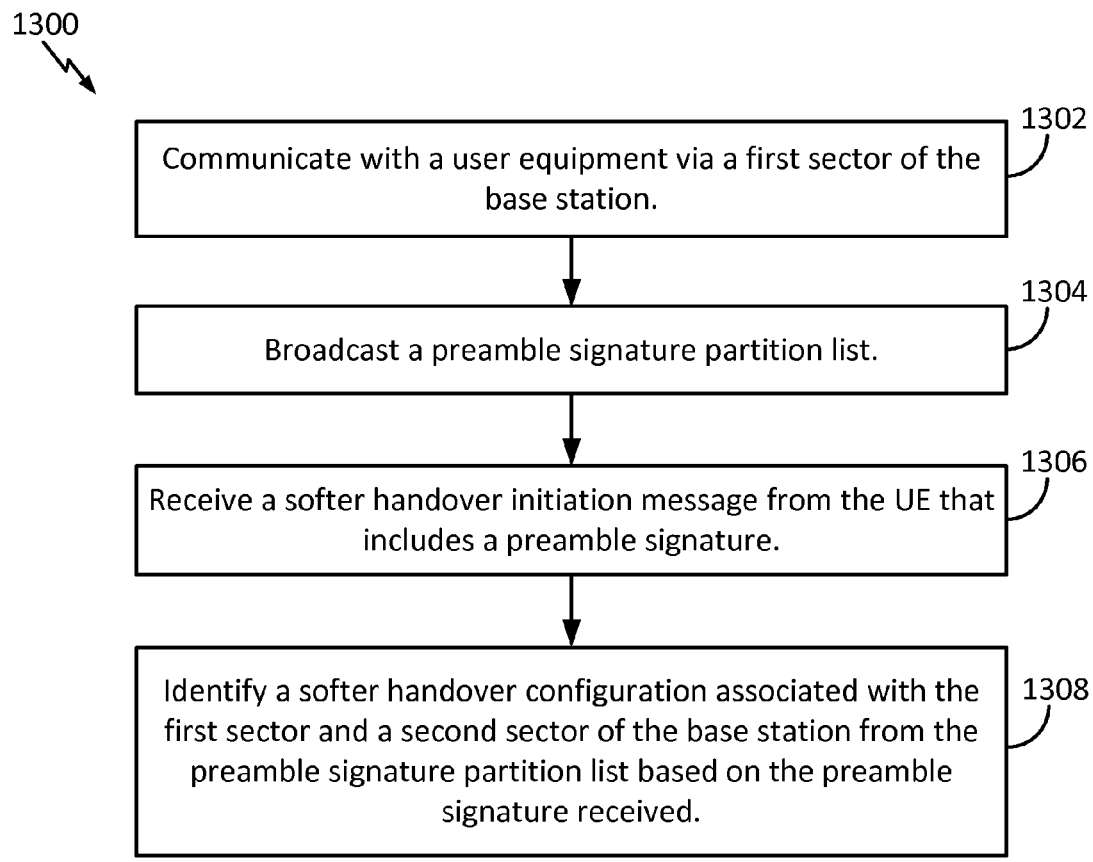
FIG. 13 illustrates a method operational at a base station for enabling softer handover while a user equipment is in a non-dedicated channel state.

FIG. 13 illustrates a method 1300 operational at a base station for enabling softer handover while a UE is in a non-dedicated channel state according to one aspect of the disclosure. At step 1302, the base station communicates with a UE via a first sector of the base station. At step 1304, the base station broadcasts a preamble signature partition list. At step 1306, the base station receives a softer handover initiation message from the UE that includes a preamble signature. At step 1308, the base station identifies a softer handover configuration associated with the first sector and a second sector of the base station from the preamble signature partition list based on the preamble signature received.

Figure 14:
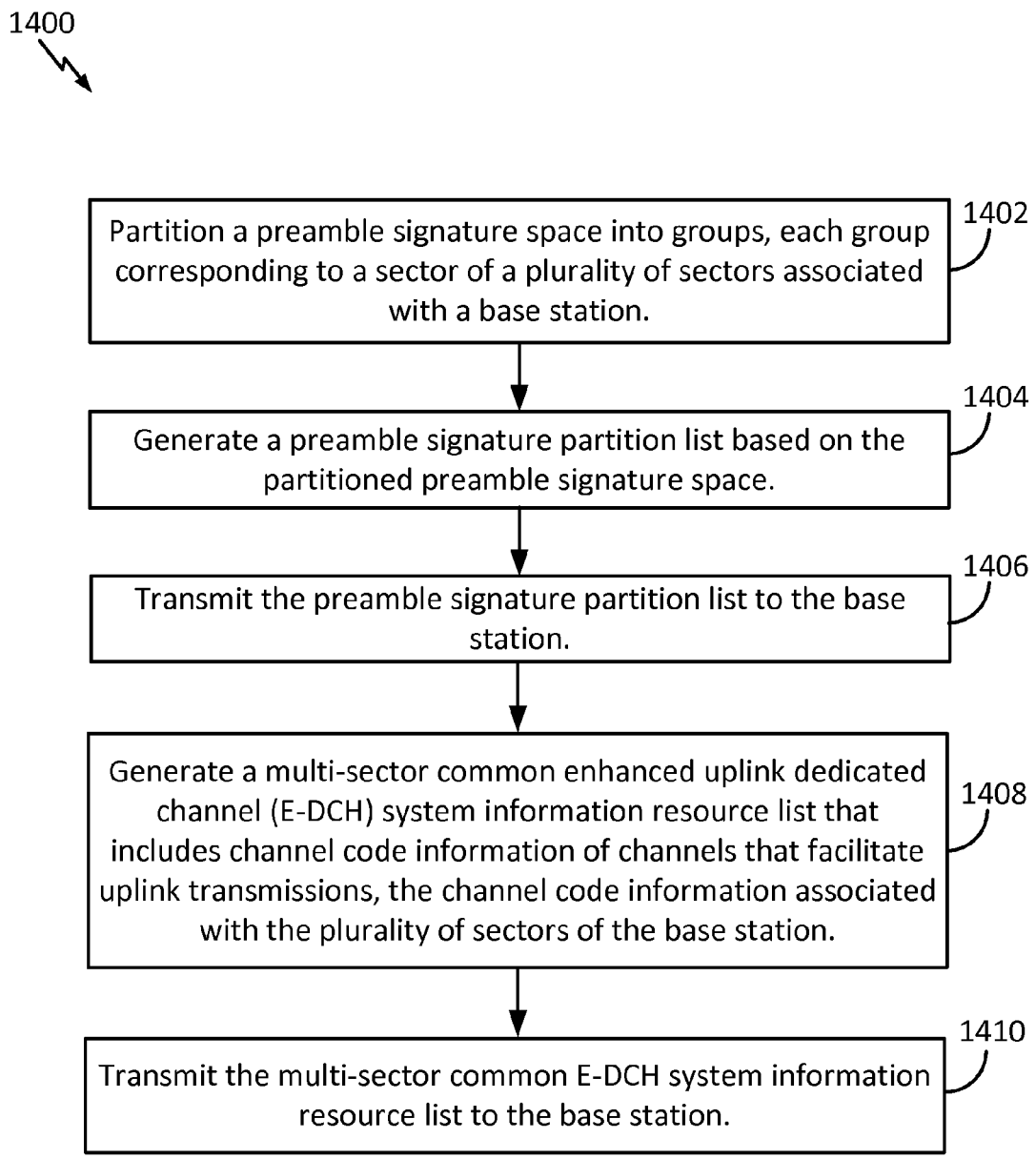
FIG. 14 illustrates a method operational at a network node for enabling softer handover while a user equipment is in a non-dedicated channel state.

FIG. 14 illustrates a method 1400 operational at a network node (e.g., a RNC or an evolved Node B) for enabling softer handover while a UE is in a non-dedicated channel state according to one aspect of the disclosure. At step 1402, the network node partitions a preamble signature space into groups, each group corresponding to a sector of a plurality of sectors associated with a base station. At step 1404, the network node generates a preamble signature partition list based on the partitioned preamble signature space. At step 1406, the network node transmits the preamble signature partition list to the base station. At step 1408, the network node generates a multi-sector common enhanced uplink dedicated channel (E-DCH) system information resource list that includes channel code information of channels that facilitate uplink transmissions, the channel code information associated with the plurality of sectors of the base station. At step 1410, the network node transmits the multi-sector common E-DCH system information resource list to the base station.

Figure 15:
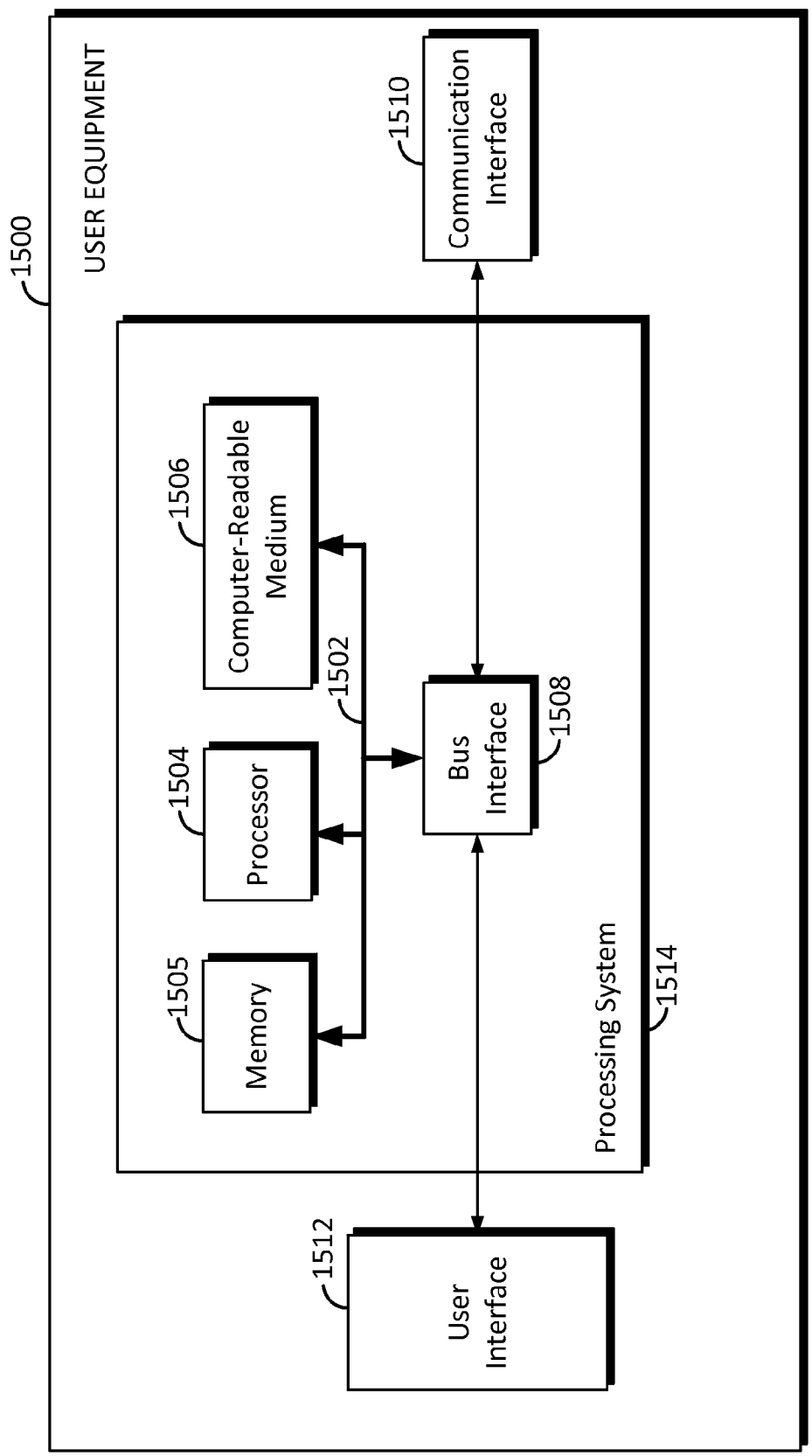
FIG. 15 is a conceptual block diagram of a hardware implementation for a user equipment.

FIG. 15 is a conceptual block diagram illustrating an example of a hardware implementation for a user equipment (UE) 1500. The UE 1500 may be representative of any of the UEs 110, 230, 232, 234, 236, 238, 240, 350, 702 described above. The UE 1500 may include a processing system 1514, a communication interface 1510, and a user interface 1512. Te processing system may include a processor 1504, a memory 1505, a computer-readable medium 1506, a bus interface 1508, and a bus 1502. The processing system 1514 may be adapted to perform any of the steps, functions, and/or processes performed by a UE depicted in FIGS. 1-3, 5, 7, 10A, 10B, 11A, 11B, 11C, and 12.

The processor 1504 (e.g., processing circuit) may be one or more processors that are adapted to process data for the UE 1500. For example, the processing circuit 1504 may be a specialized processor, such as an ASIC that serves as a means for communicating with a base station via a first sector of the base station; receiving a preamble signature partition list, a means for determining that a second sector of the base station is available for softer handover, a means for selecting a preamble signature from the preamble signature partition list corresponding to a softer handover configuration associated with the first sector and the second sector, and a means for transmitting a softer handover initiation message including the preamble signature while in a non-dedicated channel state. Examples of processors 1504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. The processor 1504 is also responsible for managing the bus 1502, and executing software stored on the computer-readable medium 1506 and/or memory 1505. The software, when executed by the processor 1504, causes the processing system 1514 to perform the various functions, steps, and/or processes describe above for any of the UEs. The computer-readable medium 1506 may be used for storing data that is manipulated by the processor 1504 when executing software.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1506. The computer-readable medium 1506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 1506 may reside in the processing system 1514, external to the processing system 1514, or distributed across multiple entities including the processing system 1514. The computer-readable medium 1506 may be embodied in a computer program product.

In this example, the processing system 1514 may be implemented with a bus architecture, represented generally by the bus 1502. The bus 1502 may include any number of interconnecting buses and bridges depending on the specific application of the processing system 1514 and the overall design constraints. The bus 1502 links together various circuits including one or more processors (represented generally by the processor 1504), a memory 1505, and computer-readable media (represented generally by the computer-readable medium 1506). The bus 1502 may also link various other circuits such as timing sources, peripherals, voltage regulators, and power management circuits, which are well known in the art, and therefore, will not be described any further. A bus interface 1508 provides an interface between the bus 1502 and the communication interface 1510. The communication interface 1510 provides a means for communicating with other apparatus over a transmission medium. The communication interface 1510 may be a wireless transceiver that allows the UE 1500 to communicate with one or more network components of a wireless network, such as one or more base stations. Depending upon the nature of the apparatus, a user interface 1512 (e.g., keypad, display, speaker, microphone, touchscreen display, etc.) may also be provided.

Figure 16:
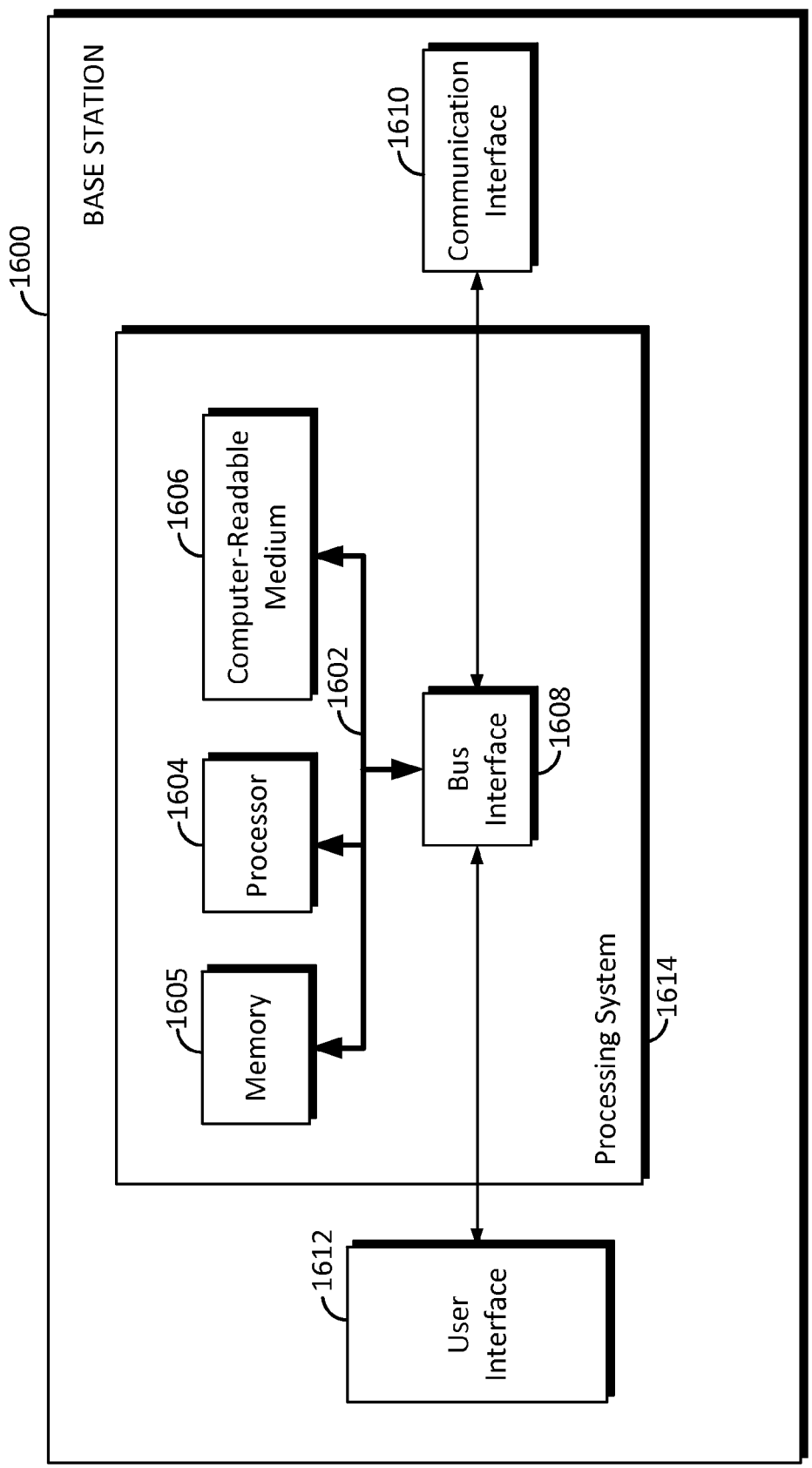
FIG. 16 is a conceptual block diagram of a hardware implementation for a base station.

FIG. 16 is a conceptual block diagram illustrating an example of a hardware implementation for a base station 1600. The base station 1600 may be representative of any of the Node Bs and base stations 108, 242, 244, 246, 310, 604 described above. The base station 1600 may include a processing system 1614, a communication interface 1610, and a user interface 1612. Te processing system may include a processor 1604, a memory 1605, a computer-readable medium 1606, a bus interface 1608, and a bus 1602. The processing system 1614 may be adapted to perform any of the steps, functions, and/or processes performed by a Node B or base station depicted in FIGS. 1-3, 5-7, 10A, 10B, 11A, 11B, 11C, and 13.

The processor 1604 (e.g., processing circuit) may be one or more processors that are adapted to process data for the base station 1600. For example, the processing circuit 1604 may be a specialized processor, such as an ASIC that serves as a means for communicating with a user equipment (UE) via a first sector of the base station, a means for broadcasting a preamble signature partition list, a means for receiving a softer handover initiation message from the UE that includes a preamble signature, and a means for identifying a softer handover configuration associated with the first sector and a second sector of the base station from the preamble signature partition list based on the preamble signature received. Examples of processors 1604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. The processor 1604 is also responsible for managing the bus 1602, and executing software stored on the computer-readable medium 1606 and/or memory 1605. The software, when executed by the processor 1604, causes the processing system 1614 to perform the various functions, steps, and/or processes describe above for any of the Node Bs and base stations. The computer-readable medium 1606 may be used for storing data that is manipulated by the processor 1604 when executing software.

The software may reside on a computer-readable medium 1606. The computer-readable medium 1606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 1606 may reside in the processing system 1614, external to the processing system 1614, or distributed across multiple entities including the processing system 1614. The computer-readable medium 1606 may be embodied in a computer program product.

In this example, the processing system 1614 may be implemented with a bus architecture, represented generally by the bus 1602. The bus 1602 may include any number of interconnecting buses and bridges depending on the specific application of the processing system 1614 and the overall design constraints. The bus 1602 links together various circuits including one or more processors (represented generally by the processor 1604), a memory 1605, and computer-readable media (represented generally by the computer-readable medium 1606). The bus 1602 may also link various other circuits such as timing sources, peripherals, voltage regulators, and power management circuits, which are well known in the art, and therefore, will not be described any further. A bus interface 1608 provides an interface between the bus 1602 and the communication interface 1610. The communication interface 1610 provides a means for communicating with other apparatus over a transmission medium. The communication interface 1610 may be a wireless transceiver that allows the base station 1600 to communicate with one or more network components of a wireless network, such as one or more UEs and/or RNCs. Depending upon the nature of the apparatus, a user interface 1612 (e.g., keypad, display, speaker, microphone, touchscreen display, etc.) may also be provided.

Figure 17:
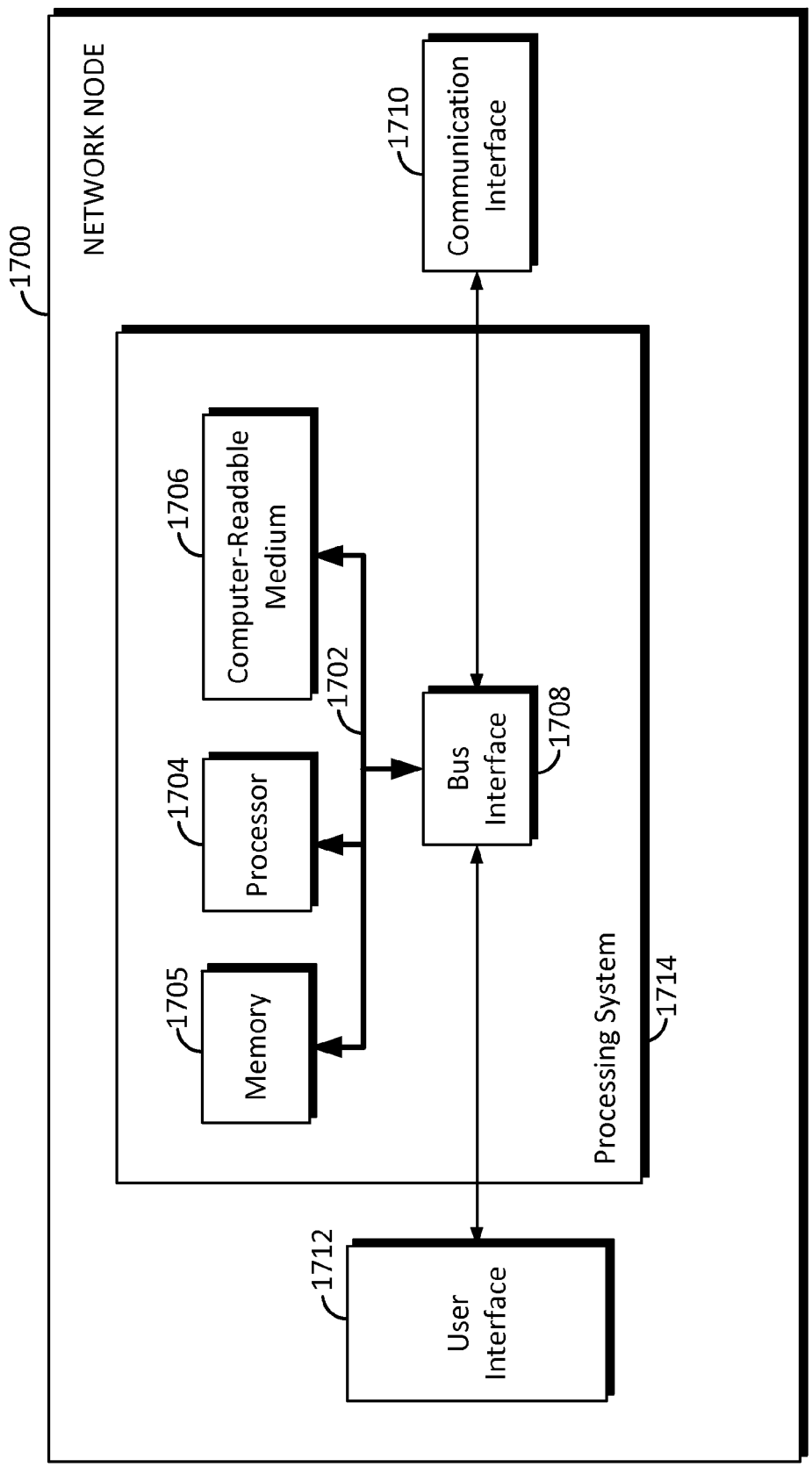
FIG. 17 is a conceptual block diagram of a hardware implementation for a network node.

FIG. 17 is a conceptual block diagram illustrating an example of a hardware implementation for a network node 1700. According to one aspect of the disclosure, the network node 1700 may be a radio network controller (RNC), and according to another aspect of the disclosure, the network node 1700 may be an evolved Node B associated with an LTE network. The network node 1700 may be representative of any of the RNCs 106, 602 described above. The network node 1700 may include a processing system 1714, a communication interface 1710, and a user interface 1712. Te processing system may include a processor 1704, a memory 1705, a computer-readable medium 1706, a bus interface 1708, and a bus 1702. The processing system 1714 may be adapted to perform any of the steps, functions, and/or processes performed by an RNC or network node depicted in FIGS. 1, 5-7, 10A, 10B, 11A, 11B, 11C, and 14.

The processor 1704 (e.g., processing circuit) may be one or more processors that are adapted to process data for the network node 1700. For example, the processing circuit 1704 may be a specialized processor, such as an ASIC that serves as a means for partitioning a preamble signature space into groups, each group corresponding to a sector of a plurality of sectors associated with a base station, a means for generating a preamble signature partition list based on the partitioned preamble signature space, and a means for transmitting the preamble signature partition list to the base station. Examples of processors 1704 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. The processor 1704 is also responsible for managing the bus 1702, and executing software stored on the computer-readable medium 1706 and/or memory 1705. The software, when executed by the processor 1704, causes the processing system 1714 to perform the various functions, steps, and/or processes describe above for any of the RNCs and network nodes. The computer-readable medium 1706 may be used for storing data that is manipulated by the processor 1704 when executing software.

The software may reside on a computer-readable medium 1706. The computer-readable medium 1706 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 1706 may reside in the processing system 1714, external to the processing system 1714, or distributed across multiple entities including the processing system 1714. The computer-readable medium 1706 may be embodied in a computer program product.

In this example, the processing system 1714 may be implemented with a bus architecture, represented generally by the bus 1702. The bus 1702 may include any number of interconnecting buses and bridges depending on the specific application of the processing system 1714 and the overall design constraints. The bus 1702 links together various circuits including one or more processors (represented generally by the processor 1704), a memory 1705, and computer-readable media (represented generally by the computer-readable medium 1706). The bus 1702 may also link various other circuits such as timing sources, peripherals, voltage regulators, and power management circuits, which are well known in the art, and therefore, will not be described any further. A bus interface 1708 provides an interface between the bus 1702 and a communication interface 1710. The communication interface 1710 provides a means for communicating with various apparatus over a transmission medium. The communication interface 1710 may be a wireless transceiver that allows the network node 1700 to communicate with one or more network components of a wireless network, such as one or more base stations and/or UEs. Depending upon the nature of the apparatus, a user interface 1712 (e.g., keypad, display, speaker, microphone, touchscreen display, etc.) may also be provided.

Moreover, various aspects of the present disclosure provide these capabilities in other RRC states beyond merely the Cell_FACH state. That is, while some of the softer handover described in detail herein may refer to the Cell_FACH state, the procedures can equally be applied to UEs in other non-dedicated channel RRC states such as URA_PCH, Cell_PCH, or even in Idle mode.

Several aspects of a telecommunications system have been presented with reference to a W-CDMA system. As those skilled in the art will readily appreciate, various aspects described throughout this disclosure may be extended to other telecommunication systems, network architectures and communication standards. By way of example, various aspects may be extended to other UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

One or more of the components, steps, features, and/or functions illustrated in FIGS. 1, 2, 3, 4, 5, 6, 7, 8A, 8B, 8C, 9, 10A, 10B, 11A, 11B, 11C, 12, 13, 14, 15, 16, and/or 17 may be rearranged and/or combined into a single component, step, feature or function or embodied in several components, steps, or functions. Additional elements, components, steps, and/or functions may also be added without departing from the disclosure. The apparatus, devices, and/or components illustrated in FIGS. 1, 2, 3, 6, 7, 15, 16, and/or 17 may be configured to perform one or more of the methods, features, or steps described in FIGS. 4, 5, 8A, 8B, 8C, 9, 10A, 10B, 11A, 11B, 11C, 12, 13, and/or 14. The algorithms described herein may also be efficiently implemented in software and/or embedded in hardware.

Moreover, in one aspect of the disclosure, the processing circuit 1504 illustrated in FIG. 15 may be a specialized processor (e.g., an application specific integrated circuit (ASIC)) that is specifically designed and/or hard-wired to perform the algorithms, methods, and/or steps described in FIGS. 5, 10A, 10B, 11A, 11B, 11C, and/or 12. Thus, such a specialized processor (ASIC) may be one example of a means for executing the algorithms, methods, and/or steps described in FIGS. 5, 10A, 10B, 11A, 11B, 11C, and/or 12. The computer-readable medium 1506 may also store processor readable instructions that when executed by a specialized processor (e.g., ASIC) 1504 causes the specialized processor to perform the algorithms, methods, and/or steps described in FIGS. 5, 10A, 10B, 11A, 11B, 11C, and/or 12. In another aspect of the disclosure, the processing circuit 1604 illustrated in FIG. 16 may be a specialized processor (e.g., an application specific integrated circuit (ASIC)) that is specifically designed and/or hard-wired to perform the algorithms, methods, and/or steps described in FIGS. 5, 10A, 10B, 11A, 11B, 11C, and/or 13. Thus, such a specialized processor (ASIC) may be one example of a means for executing the algorithms, methods, and/or steps described in FIGS. 5, 10A, 10B, 11A, 11B, 11C, and/or 13. The computer-readable medium 1606 may also store processor readable instructions that when executed by a specialized processor (e.g., ASIC) 1604 causes the specialized processor to perform the algorithms, methods, and/or steps described in FIGS. 5, 10A, 10B, 11A, 11B, 11C, and/or 13. In yet another aspect of the disclosure, the processing circuit 1704 illustrated in FIG. 17 may be a specialized processor (e.g., an application specific integrated circuit (ASIC)) that is specifically designed and/or hard-wired to perform the algorithms, methods, and/or steps described in FIGS. 5, 10A, 10B, 11A, 11B, 11C, and/or 14. Thus, such a specialized processor (ASIC) may be one example of a means for executing the algorithms, methods, and/or steps described in FIGS. 5, 10A, 10B, 11A, 11B, 11C, and/or 14. The computer-readable medium 1706 may also store processor readable instructions that when executed by a specialized processor (e.g., ASIC) 1704 causes the specialized processor to perform the algorithms, methods, and/or steps described in FIGS. 5, 10A, 10B, 11A, 11B, 11C, and/or 14.

Also, it is noted that the aspects of the present disclosure may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums and, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, aspects of the disclosure may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the disclosure described herein can be implemented in different systems without departing from the disclosure. It should be noted that the foregoing aspects of the disclosure are merely examples and are not to be construed as limiting the disclosure. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A method of wireless communication operable at a user equipment, the method comprising:
   communicating with a base station via a first sector of the base station;
   receiving a preamble signature partition list;
   determining that a second sector of the base station is available for softer handover;
   selecting a preamble signature from the preamble signature partition list corresponding to a softer handover configuration associated with the first sector and the second sector; and
   transmitting a softer handover initiation message including the preamble signature while in a non-dedicated channel state.

2. The method of claim 1, wherein the non-dedicated channel state is a Cell_FACH state.

3. The method of claim 1, wherein the first sector is a serving sector and the second sector is a non-serving sector.

4. The method of claim 1, wherein determining that the second sector of the base station is available for softer handover comprises:
   determining that a power level difference between a first signal received from the first sector and a second signal received from the second sector is less than a predefined threshold value.

5. The method of claim 4, wherein the first signal and the second signal are common pilot indicator channels.

6. The method of claim 1, wherein determining that the second sector of the base station is available for softer handover comprises:
   determining that the signal to noise ratio of a signal received from the second sector is greater than a predefined threshold value.

7. The method of claim 1, wherein the softer handover initiation message is a random access message transmitted over a physical random access channel (PRACH).

8. The method of claim 1, further comprising:
   receiving a multi-sector common enhanced uplink dedicated channel (E-DCH) system information resource list that includes channel code information of channels that facilitate uplink transmissions, the channel code information associated with a plurality of sectors of the base station.

9. The method of claim 8, further comprising:
   receiving a multi-sector E-DCH resource index value from the base station in response to transmitting the softer handover initiation message.

10. The method of claim 9, further comprising:
    selecting E-DCH resources from the multi-sector common E-DCH system information resource list based on the multi-sector E-DCH resource index value;
    receiving a first data stream from a first portion of the selected E-DCH resources via the first sector; and
    receiving a second data stream from a second portion of the selected E-DCH resources via the second sector.

11. The method of claim 10, wherein the first portion of the selected E-DCH resources includes at least one of a fractional dedicated physical channel (F-DPCH), E-DCH Hybrid Automatic Repeat Request (HARQ) Indicator Channel (E-HICH), and/or a E-DCH Relative Grant Channel (E-RGCH) associated with the first sector, and the second portion of the selected E-DCH resources includes at least one of a fractional dedicated physical channel (F-DPCH), E-DCH Hybrid Automatic Repeat Request (HARQ) Indicator Channel (E-HICH), and/or a E-DCH Relative Grant Channel (E-RGCH) associated with the second sector.

12. The method of claim 9, further comprising:
    demodulating the first data stream and the second data stream; and
    soft combining the demodulated first data stream with the second data stream to recover an underlying raw data.

13. A user equipment comprising:
    a communication interface adapted to communicate with a base station via a first sector of the base station; and
    a processing circuit communicatively coupled to the communication interface, the processing circuit adapted to
    receive a preamble signature partition list,
    determine that a second sector of the base station is available for softer handover, select a preamble signature from the preamble signature partition list corresponding to a softer handover configuration associated with the first sector and the second sector, and transmit a softer handover initiation message including the preamble signature while in a non-dedicated channel state.

14. The user equipment of claim 13, wherein the non-dedicated channel state is a Cell_FACH state.

15. The user equipment of claim 13, wherein the first sector is a serving sector and the second sector is a non-serving sector.

16. The user equipment of claim 13, wherein the processing circuit adapted to determine that the second sector of the base station is available for softer handover comprises:

determine that a power level difference between a first signal received from the first sector and a second signal received from the second sector is less than a predefined threshold value.

17. The user equipment of claim 16, wherein the first signal and the second signal are common pilot indicator channels.

18. The user equipment of claim 13, wherein the processing circuit is adapted to determine that the second sector of the base station is available for softer handover comprises:

determine that the signal to noise ratio of a signal received from the second sector is greater than a predefined threshold value.

19. The user equipment of claim 13, wherein the softer handover initiation message is a random access message transmitted over a physical random access channel (PRACH).

20. The user equipment of claim 13, wherein the processing circuit is further adapted to:

receive a multi-sector common enhanced uplink dedicated channel (E-DCH) system information resource list that includes channel code information of channels that facilitate uplink transmissions, the channel code information associated with a plurality of sectors of the base station.

21. The user equipment of claim 20, wherein the processing circuit is further adapted to:

receive a multi-sector E-DCH resource index value from the base station in response to transmitting the softer handover initiation message.

22. The user equipment of claim 21, wherein the processing circuit is further adapted to:

select E-DCH resources from the multi-sector common E-DCH system information resource list based on the multi-sector E-DCH resource index value;

receive a first data stream from a first portion of the selected E-DCH resources via the first sector; and receive a second data stream from a second portion of the selected E-DCH resources via the second sector.

23. The user equipment of claim 22, wherein the first portion of the selected E-DCH resources includes at least one of a fractional dedicated physical channel (F-DPCH), E-DCH Hybrid Automatic Repeat Request (HARQ) Indicator Channel (E-HICH), and/or a E-DCH Relative Grant Channel (E-RGCH) associated with the first sector, and the second portion of the selected E-DCH resources includes at least one of a fractional dedicated physical channel (F-DPCH), E-DCH Hybrid Automatic Repeat Request (HARQ) Indicator Channel (E-HICH), and/or a E-DCH Relative Grant Channel (E-RGCH) associated with the second sector.

24. The user equipment of claim 21, wherein the processing circuit is further adapted to:

demodulate the first data stream and the second data stream; and soft combine the demodulated first data stream with the second data stream to recover an underlying raw data.

25. A user equipment comprising:

means for communicating with a base station via a first sector of the base station;

means for receiving a preamble signature partition list;

means for determining that a second sector of the base station is available for softer handover;

means for selecting a preamble signature from the preamble signature partition list corresponding to a softer handover configuration associated with the first sector and the second sector; and means for transmitting a softer handover initiation message including the preamble signature while in a non-dedicated channel state.

26. The user equipment of claim 25, wherein the non-dedicated channel state is a Cell_FACH state.

27. The user equipment of claim 25, wherein the means for determining that the second sector of the base station is available for softer handover comprises:

means for determining that a power level difference between a first signal received from the first sector and a second signal received from the second sector is less than a predefined threshold value.

28. The user equipment of claim 25, further comprising:

means for receiving a multi-sector common enhanced uplink dedicated channel (E-DCH) system information resource list that includes channel code information of channels that facilitate uplink transmissions, the channel code information associated with a plurality of sectors of the base station.

29. The user equipment of claim 28, further comprising:

means for receiving a multi-sector E-DCH resource index value from the base station in response to transmitting the softer handover initiation message;

means for selecting E-DCH resources from the multi-sector common E-DCH system information resource list based on the multi-sector E-DCH resource index value;

means for receiving a first data stream from a first portion of the selected E-DCH resources via the first sector; and means for receiving a second data stream from a second portion of the selected E-DCH resources via the second sector.

30. A non-transitory processor-readable medium having one or more instructions stored thereon, which when executed by at least one processor causes the processor to:

communicate with a base station via a first sector of the base station;

receive a preamble signature partition list;

determine that a second sector of the base station is available for softer handover;

select a preamble signature from the preamble signature partition list corresponding to a softer handover configuration associated with the first sector and the second sector; and transmit a softer handover initiation message including the preamble signature while in a non-dedicated channel state.

31. The non-transitory processor-readable medium of claim 30, wherein the non-dedicated channel state is a Cell_FACH state.

32. The non-transitory processor-readable medium of claim 30, wherein the instruction that causes the processor to determine that the second sector of the base station is available for softer handover further causes the processor to:

determine that a power level difference between a first signal received from the first sector and a second signal received from the second sector is less than a predefined threshold value.

33. The non-transitory processor-readable medium of claim 30, wherein the instructions which when executed by the processor further causes the processor to:
receive a multi-sector common enhanced uplink dedicated channel (E-DCH) system information resource list that includes channel code information of channels that facilitate uplink transmissions, the channel code information associated with a plurality of sectors of the base station.

34. The non-transitory processor-readable medium of claim 33, wherein the instructions which when executed by the processor further causes the processor to:
receive a multi-sector E-DCH resource index value from the base station in response to transmitting the softer handover initiation message;
select E-DCH resources from the multi-sector common E-DCH system information resource list based on the multi-sector E-DCH resource index value;
receive a first data stream from a first portion of the selected E-DCH resources via the first sector; and
receive a second data stream from a second portion of the selected E-DCH resources via the second sector.

35. A method of wireless communication operable at a base station, the method comprising:
communicating with a user equipment (UE) via a first sector of the base station;
broadcasting a preamble signature partition list;
receiving a softer handover initiation message from the UE that includes a preamble signature; and
identifying a softer handover configuration associated with the first sector and a second sector of the base station from the preamble signature partition list based on the preamble signature received.

36. The method of claim 35, wherein the first sector is a serving sector to the UE and the second sector is a non-serving sector to the UE.

37. The method of claim 35, wherein the softer handover initiation message is a random access message received over a physical random access channel (PRACH).

38. The method of claim 35, further comprising:
receiving the preamble signature partition list from a radio network controller (RNC).

39. The method of claim 35, further comprising:
receiving a multi-sector common enhanced uplink dedicated channel (E-DCH) system information resource list from an RNC.

40. The method of claim 35, further comprising:
determining that the UE is located within the first sector and the second sector based on the preamble signature received.

41. The method of claim 40, further comprising:
determining that the UE desires to engage in the softer handover configuration associated with the first sector and a second sector while the UE is in a non-dedicated channel state.

42. The method of claim 41, wherein the non-dedicated channel state is a Cell_FACH state.

43. The method of claim 35, further comprising:
transmitting a multi-sector common E-DCH system information resource list to the UE that includes channel code information of channels that facilitate uplink transmissions, the channel code information associated with a plurality of sectors of the base station.

44. The method of claim 43, further comprising:
transmitting a multi-sector E-DCH resource index value to the UE in response to receiving the softer handover initiation message.

45. The method of claim 44, further comprising:
transmitting, via the first sector, a first data stream over a first portion of E-DCH resources corresponding to the multi-sector E-DCH resource index value; and
transmitting, via the second sector, a second data stream over a second portion of E-DCH resources corresponding to the multi-sector E-DCH resource index value.

46. The method of claim 35, wherein the base station is one of a Node B or an evolved Node B.

47. The method of claim 35, wherein the first sector and the second sector are both associated with a same carrier frequency.

48. A base station comprising:
a communication interface adapted to communicate with a user equipment (UE) via a first sector of the base station; and
a processing circuit communicatively coupled to the communication interface, the processing circuit adapted to
broadcast a preamble signature partition list,
receive a softer handover initiation message from the UE that includes a preamble signature, and
identify a softer handover configuration associated with the first sector and a second sector of the base station from the preamble signature partition list based on the preamble signature received.

49. The base station of claim 48, wherein the first sector is a serving sector to the UE and the second sector is a non-serving sector to the UE.

50. The base station of claim 48, wherein the softer handover initiation message is a random access message received over a physical random access channel (PRACH).

51. The base station of claim 48, wherein the processing circuit is further adapted to:
receive the preamble signature partition list from a radio network controller (RNC).

52. The base station of claim 48, wherein the processing circuit is further adapted to:
receive a multi-sector common enhanced uplink dedicated channel (E-DCH) system information resource list from an RNC.

53. The base station of claim 48, wherein the processing circuit is further adapted to:
determine that the UE is located within the first sector and the second sector based on the preamble signature received.

54. The base station of claim 53, wherein the processing circuit is further adapted to:
determine that the UE desires to engage in the softer handover configuration associated with the first sector and a second sector while the UE is in a non-dedicated channel state.

55. The base station of claim 54, wherein the non-dedicated channel state is a Cell_FACH state.

56. The base station of claim 48, wherein the processing circuit is further adapted to:
transmit a multi-sector common E-DCH system information resource list to the UE that includes channel code information of channels that facilitate uplink transmissions, the channel code information associated with a plurality of sectors of the base station.

57. The base station of claim 56, wherein the processing circuit is further adapted to:
  transmit a multi-sector E-DCH resource index value to the UE in response to receiving the softer handover initiation message.
58. The base station of claim 57, wherein the processing circuit is further adapted to:
  transmit, via the first sector, a first data stream over a first portion of E-DCH resources corresponding to the multi-sector E-DCH resource index value; and
  transmit, via the second sector, a second data stream over a second portion of E-DCH resources corresponding to the multi-sector E-DCH resource index value.
59. The base station of claim 48, wherein the base station is one of a Node B or an evolved Node B.
60. The base station of claim 48, wherein the first sector and the second sector are both associated with a same carrier frequency.
61. A base station comprising:
  means for communicating with a user equipment (UE) via a first sector of the base station;
  means for broadcasting a preamble signature partition list;
  means for receiving a softer handover initiation message from the UE that includes a preamble signature; and
  means for identifying a softer handover configuration associated with the first sector and a second sector of the base station from the preamble signature partition list based on the preamble signature received.
62. The base station of claim 61, further comprising:
  means for receiving the preamble signature partition list from a radio network controller (RNC); and
  means for receiving a multi-sector common enhanced uplink dedicated channel (E-DCH) system information resource list from the RNC.
63. The base station of claim 61, further comprising:
  means for determining that the UE is located within the first sector and the second sector based on the preamble signature received.
64. The base station of claim 63, further comprising:
  means for determining that the UE desires to engage in the softer handover configuration associated with the first sector and a second sector while the UE is in a Cell_FACH state.
65. The base station of claim 61, further comprising:
  means for transmitting a multi-sector common E-DCH system information resource list to the UE that includes channel code information of channels that facilitate uplink transmissions, the channel code information associated with a plurality of sectors of the base station.
66. The base station of claim 65, further comprising:
  means for transmitting a multi-sector E-DCH resource index value to the UE in response to receiving the softer handover initiation message;
  means for transmitting, via the first sector, a first data stream over a first portion of E-DCH resources corresponding to the multi-sector E-DCH resource index value; and
  means for transmitting, via the second sector, a second data stream over a second portion of E-DCH resources corresponding to the multi-sector E-DCH resource index value.
67. A non-transitory processor-readable medium having one or more instructions stored thereon, which when executed by at least one processor causes the processor to:
  communicate with a user equipment (UE) via a first sector of a base station;
  broadcast a preamble signature partition list;
  receive a softer handover initiation message from the UE that includes a preamble signature; and
  identify a softer handover configuration associated with the first sector and a second sector of the base station from the preamble signature partition list based on the preamble signature received.
68. The non-transitory processor-readable medium of claim 67, wherein the instructions which when executed by the processor further cause the processor to:
  receive the preamble signature partition list from a radio network controller (RNC); and
  receive a multi-sector common enhanced uplink dedicated channel (E-DCH) system information resource list from the RNC.
69. The non-transitory processor-readable medium of claim 67, wherein the instructions which when executed by the processor further cause the processor to:
  determine that the UE is located within the first sector and the second sector based on the preamble signature received.
70. The non-transitory processor-readable medium of claim 69, wherein the instructions which when executed by the processor further cause the processor to:
  determine that the UE desires to engage in the softer handover configuration associated with the first sector and a second sector while the UE is in a Cell_FACH state.
71. The non-transitory processor-readable medium of claim 67, wherein the instructions which when executed by the processor further cause the processor to:
  transmit a multi-sector common E-DCH system information resource list to the UE that includes channel code information of channels that facilitate uplink transmissions, the channel code information associated with a plurality of sectors of the base station.
72. The non-transitory processor-readable medium of claim 71, wherein the instructions which when executed by the processor further cause the processor to:
  transmit a multi-sector E-DCH resource index value to the UE in response to receiving the softer handover initiation message;
  transmit, via the first sector, a first data stream over a first portion of E-DCH resources corresponding to the multi-sector E-DCH resource index value; and
  transmit, via the second sector, a second data stream over a second portion of E-DCH resources corresponding to the multi-sector E-DCH resource index value.
73. A method of wireless communication operable at a network node, the method comprising:
  partitioning a preamble signature space into groups, each group corresponding to a sector of a plurality of sectors associated with a base station,
  generating a preamble signature partition list based on the partitioned preamble signature space, wherein at least one of the preamble signatures in the preamble signature partition list corresponds to a softer handover configuration associated with a plurality of sectors of the base station: and
  transmitting the preamble signature partition list to the base station.
74. The method of claim 73, further comprising:
  generating a multi-sector common enhanced uplink dedicated channel (E-DCH) system information resource list that includes channel code information of channels that facilitate uplink transmissions, the channel code information associated with the plurality of sectors of the base station.

75. The method of claim 74, further comprising:
transmitting the multi-sector common E-DCH system information resource list to the base station.

76. The method of claim 73, further comprising:
generating at least one predefined power threshold value used to determine whether to enable a user equipment in communication with the base station to engage in softer handover between two or more sectors of the plurality of sectors associated with the base station.

77. The method of claim 76, wherein a first predefined power threshold value determines whether to enable the user equipment to engage in softer handover between a first set of sectors of the plurality of sectors associated with the base station and a second predefined power threshold value determines whether to enable the user equipment to engage in softer handover between a second different set of sectors of the plurality of sectors associated with the base station.

78. The method of claim 73, wherein the preamble signature partition list is adapted to enable a user equipment in communication with the base station to execute softer handover between two or more sectors of the plurality of sectors associated with the base station.

79. The method of claim 78, wherein the preamble signature partition list is further adapted to enable the user equipment to execute softer handover in a non-dedicated channel state.

80. The method of claim 79, wherein the non-dedicated channel state is a Cell_FACH state.

81. The method of claim 73, wherein the network node is one of a radio network controller (RNC) or an evolved Node B.

82. A network node comprising:
a communication interface adapted to communicate to a network; and
a processing circuit communicatively coupled to the communication interface, the processing circuit adapted to
partition a preamble signature space into groups, each group corresponding to a sector of a plurality of sectors associated with a base station,
generate a preamble signature partition list based on the partitioned preamble signature space, wherein at least one of the preamble signatures in the preamble signature partition list corresponds to a softer handover configuration associated with a plurality of sectors of the base station; and
transmit the preamble signature partition list to the base station.

83. The network node of claim 82, wherein the processing circuit is further adapted to:
generate a multi-sector common enhanced uplink dedicated channel (E-DCH) system information resource list that includes channel code information of channels that facilitate uplink transmissions, the channel code information associated with the plurality of sectors of the base station.

84. The network node of claim 83, wherein the processing circuit is further adapted to:
transmit the multi-sector common E-DCH system information resource list to the base station.

85. The network node of claim 82, wherein the processing circuit is further adapted to:
generate at least one predefined power threshold value used to determine whether to enable a user equipment in communication with the base station to engage in softer handover between two or more sectors of the plurality of sectors associated with the base station.

86. The network node of claim 85, wherein a first predefined power threshold value determines whether to enable the user equipment to engage in softer handover between a first set of sectors of the plurality of sectors associated with the base station and a second predefined power threshold value determines whether to enable the user equipment to engage in softer handover between a second different set of sectors of the plurality of sectors associated with the base station.

87. The network node of claim 82, wherein the preamble signature partition list is adapted to enable a user equipment in communication with the base station to execute softer handover between two or more sectors of the plurality of sectors associated with the base station.

88. The network node of claim 87, wherein the preamble signature partition list is further adapted to enable the user equipment to execute softer handover in a non-dedicated channel state.

89. The network node of claim 88, wherein the non-dedicated channel state is a Cell_FACH state.

90. The network node of claim 82, wherein the network node is one of a radio network controller (RNC) or an evolved Node B.

91. A network node comprising:
means for partitioning a preamble signature space into groups, each group corresponding to a sector of a plurality of sectors associated with a base station,
means for generating a preamble signature partition list based on the partitioned preamble signature space, wherein at least one of the preamble signatures in the preamble signature partition list corresponds to a softer handover configuration associated with a plurality of sectors of the base station; and
means for transmitting the preamble signature partition list to the base station.

92. The network node of claim 91, further comprising:
means for generating a multi-sector common enhanced uplink dedicated channel (E-DCH) system information resource list that includes channel code information of channels that facilitate uplink transmissions, the channel code information associated with the plurality of sectors of the base station; and
means for transmitting the multi-sector common E-DCH system information resource list to the base station.

93. The network node of claim 91, further comprising:
means for generating at least one predefined power threshold value used to determine whether to enable a user equipment in communication with the base station to engage in softer handover between two or more sectors of the plurality of sectors associated with the base station.

94. The network node of claim 93, wherein a first predefined power threshold value determines whether to enable the user equipment to engage in softer handover between a first set of sectors of the plurality of sectors associated with the base station and a second predefined power threshold value determines whether to enable the user equipment to engage in softer handover between a second different set of sectors of the plurality of sectors associated with the base station.

95. The network node of claim 91, wherein the preamble signature partition list is adapted to enable a user equipment in communication with the base station to execute softer handover between two or more sectors of the plurality of sectors associated with the base station.

96. The network node of claim 95, wherein the preamble signature partition list is further adapted to enable the user equipment to execute softer handover in a Cell_FACH state.

97. A non-transitory processor-readable medium having one or more instructions, which when executed by at least one processor causes the processor to:
  partition a preamble signature space into groups, each group corresponding to a sector of a plurality of sectors associated with a base station,
  generate a preamble signature partition list based on the partitioned preamble signature space, wherein at least one of the preamble signatures in the preamble signature partition list corresponds to a softer handover configuration associated with a plurality of sectors of the base station; and
  transmit the preamble signature partition list to the base station.

98. The non-transitory processor-readable medium of claim 97, wherein the instructions which when executed by the processor further cause the processor to:
  generate a multi-sector common enhanced uplink dedicated channel (E-DCH) system information resource list that includes channel code information of channels that facilitate uplink transmissions, the channel code information associated with the plurality of sectors of the base station; and
  transmit the multi-sector common E-DCH system information resource list to the base station.

99. The non-transitory processor-readable medium of claim 97, wherein the instructions which when executed by the processor further cause the processor to:
  generate at least one predefined power threshold value used to determine whether to enable a user equipment in communication with the base station to engage in softer handover between two or more sectors of the plurality of sectors associated with the base station.

100. The non-transitory processor-readable medium of claim 99, wherein a first predefined power threshold value determines whether to enable the user equipment to engage in softer handover between a first set of sectors of the plurality of sectors associated with the base station and a second predefined power threshold value determines whether to enable the user equipment to engage in softer handover between a second different set of sectors of the plurality of sectors associated with the base station.

101. The non-transitory processor-readable medium of claim 97, wherein the preamble signature partition list is adapted to enable a user equipment in communication with the base station to execute softer handover between two or more sectors of the plurality of sectors associated with the base station.

102. The non-transitory processor-readable medium of claim 101, wherein the preamble signature partition list is further adapted to enable the user equipment to execute softer handover in a Cell_FACH state.

* * * * *